United States Patent
Wang et al.

(10) Patent No.: US 10,666,812 B2
(45) Date of Patent: May 26, 2020

(54) CHARGING CONTROL APPARATUS, METHOD, AND SYSTEM

(71) Applicant: Huawei Technologies Co., Ltd., Shenzhen (CN)

(72) Inventors: Yufang Wang, Beijing (CN); Caijuan Wang, Shanghai (CN); Wujun Luo, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 399 days.

(21) Appl. No.: 15/600,544

(22) Filed: May 19, 2017

(65) Prior Publication Data
US 2017/0257490 A1  Sep. 7, 2017

Related U.S. Application Data

(63) Continuation of application No. PCT/CN2014/091929, filed on Nov. 21, 2014.

(51) Int. Cl.
*H04M 15/00* (2006.01)
*H04W 24/00* (2009.01)
(Continued)

(52) U.S. Cl.
CPC .......... *H04M 15/66* (2013.01); *H04L 12/14* (2013.01); *H04L 12/1407* (2013.01);
(Continued)

(58) Field of Classification Search
CPC ...... H04M 15/66; H04M 15/08; H04M 15/52; H04M 15/61; H04M 15/62; H04L 12/14;
(Continued)

(56) References Cited

U.S. PATENT DOCUMENTS

2006/0253892 A1* 11/2006 Grayson ............... H04L 63/102
726/1
2007/0038519 A1 2/2007 Johansson et al.
(Continued)

FOREIGN PATENT DOCUMENTS

CN  101232385 A  7/2008
CN  101729996 A  6/2010
(Continued)

OTHER PUBLICATIONS

3GPP TS 29.212 Policy and Charging Control (PCC); Reference points) (Year: 2013).*

*Primary Examiner* — Ernest G Tacsik
(74) *Attorney, Agent, or Firm* — Leydig, Voit & Mayer, Ltd.

(57) ABSTRACT

A charging control apparatus, a method, and a system are disclosed. When a user equipment (UE) accesses a service that charges an over the top (OTT) service (SP), the charging control apparatus receives flow description information from a policy charging enforcement function (PCEF), determines a service identifier corresponding to the data flow; and sends the service identifier to the PCEF, so that the PCEF charges for the service according to the service identifier. When the UE accesses the service, the PCEF may obtain the service identifier from the charging control apparatus. In this way, the PCEF can obtain the service identifier and the charging identifier that are corresponding to the data flow. Therefore, a configuration workload can be decreased.

4 Claims, 16 Drawing Sheets

(51) Int. Cl.
  *H04M 15/08*   (2006.01)
  *H04L 12/14*   (2006.01)
  *H04W 4/24*    (2018.01)
  *H04L 12/851*  (2013.01)
  *H04W 24/04*   (2009.01)
  *H04W 28/02*   (2009.01)

(52) U.S. Cl.
  CPC ...... *H04L 47/2441* (2013.01); *H04L 47/2483* (2013.01); *H04M 15/08* (2013.01); *H04M 15/52* (2013.01); *H04M 15/61* (2013.01); *H04M 15/62* (2013.01); *H04W 4/24* (2013.01); *H04W 24/00* (2013.01); *H04W 24/04* (2013.01); *H04W 28/0289* (2013.01)

(58) Field of Classification Search
  CPC ............. H04L 12/1407; H04L 47/2441; H04L 47/2483; H04W 4/24; H04W 24/00; H04W 24/04; H04W 28/0289
  See application file for complete search history.

(56) References Cited

U.S. PATENT DOCUMENTS

| | | | |
|---|---|---|---|
| 2010/0043053 A1 | 2/2010 | Wei et al. | |
| 2011/0295935 A1* | 12/2011 | Vihtari | H04Q 3/0045 709/203 |
| 2012/0246212 A1* | 9/2012 | Ahmad | H04L 65/4046 709/201 |
| 2012/0296784 A1* | 11/2012 | Connor | H04L 12/1407 705/34 |
| 2012/0324100 A1* | 12/2012 | Tomici | H04L 45/123 709/224 |
| 2013/0091526 A1* | 4/2013 | Iyer | H04L 65/608 725/62 |
| 2013/0114460 A1 | 5/2013 | Rubio Vidales et al. | |
| 2014/0018063 A1* | 1/2014 | Mattsson | H04W 12/06 455/423 |
| 2015/0009826 A1* | 1/2015 | Ma | H04W 28/0268 370/235 |
| 2015/0236914 A1* | 8/2015 | Woods | H04L 41/0893 370/230 |
| 2015/0319315 A1 | 11/2015 | Chai | |
| 2016/0174055 A1 | 6/2016 | Wang et al. | |

FOREIGN PATENT DOCUMENTS

| | | |
|---|---|---|
| CN | 102647698 A | 8/2012 |
| CN | 102917331 A | 2/2013 |
| CN | 103200552 A | 7/2013 |
| CN | 103888928 A | 6/2014 |
| EP | 2525550 A1 | 11/2012 |
| EP | 3010260 A1 | 4/2016 |
| RU | 2335801 C2 | 10/2008 |
| WO | 2013108138 A1 | 7/2013 |
| WO | WO 2014110719 A1 | 7/2014 |
| WO | 2014169865 A1 | 10/2014 |
| WO | 2014169877 A1 | 10/2014 |

\* cited by examiner

CHARGING CONTROL APPARATUS, METHOD, AND SYSTEM

CROSS-REFERENCE TO RELATED APPLICATIONS

This application is a continuation of International Application No. PCT/CN2014/091929, filed on Nov. 21, 2014, the disclosure of which is hereby incorporated by reference in its entirety.

TECHNICAL FIELD

Embodiments of the present invention relate to the communications field, and more specifically, to a charging control apparatus, a method, and a system.

BACKGROUND

A traffic 800 service is a service that mainly charges an Over The Top (OTT) Service Provider (SP). The OTT SP may be referred to as an enterprise group, or referred to as a group for short. With development of 4G, an operator needs to cooperate with the enterprise group to establish an industry alliance, so as to achieve multi-win among the operator, a user, and the enterprise group. The traffic 800 service is mainly paid for by the enterprise group, and more returns of value-added services can be obtained, for example, more access traffic can be obtained, and work efficiency of an employee in the enterprise group can be improved. The user does not need to worry about a fee, and has better experience of accessing the traffic 800 service. Network investment of the operator may be more greatly digested, and more expansion opportunities are obtained.

There are many OTT SPs with which the operator can cooperate. One OTT SP may provide multiple traffic 800 services. The operator needs to allocate a charging identifier to each traffic 800 service. The operator needs to be capable of rapidly deploying a new traffic 800 service in an easy and convenient manner, and flexibly and dynamically adapting to a change in a server of the OTT SP, so as to ensure that all traffic 800 services of the user can be accurately free of charge.

Currently, each OTT SP provides a server address/a host list, or a Uniform Resource Locator (URL) list of the traffic 800 service. The operator provides a service identifier and a charging identifier that are corresponding to the server address/the host list, or the URL list, and all the information needs to be preconfigured on a Policy and Charging Enforcement Function (PCEF). When the server of the traffic 800 service changes or a new traffic 800 service is provisioned, a configuration on the PCEF also needs to be correspondingly adjusted. This causes a large configuration workload on the PCEF.

SUMMARY

Embodiments of the present invention provide a charging control apparatus, a method, and a system, so that a configuration workload of a PCEF can be decreased.

According to a first aspect, a charging control apparatus is provided, where when user equipment UE accesses a service that charges an over the top OTT service provider SP, the apparatus includes:

a receiver, configured to receive flow description information from a policy and charging enforcement function PCEF, where the flow description information is obtained by the PCEF according to a data flow received from the UE;

a processor, configured to determine, according to the flow description information received by the receiver, a service identifier corresponding to the data flow; and a transmitter, configured to send the service identifier determined by the processor to the PCEF, so that the PCEF charges for the service according to the service identifier.

With reference to the first aspect, in a first possible implementation manner of the first aspect, the processor is further configured to determine, according to the flow description information received by the receiver, a charging identifier corresponding to the data flow; and the transmitter is further configured to send the charging identifier to the PCEF.

With reference to the first aspect or the foregoing first possible implementation manner of the first aspect, in a second possible implementation manner of the first aspect, the receiver is further configured to receive a user identifier of the UE;

the processor is further configured to determine whether there is a correspondence between the user identifier and the service identifier; and the transmitter is specifically configured to: when the processor determines that there is a correspondence between the user identifier and the service identifier, send the service identifier and the charging identifier to the PCEF.

With reference to any one of the first aspect or the foregoing possible implementation manners of the first aspect, in a third possible implementation manner of the first aspect, the receiver is further configured to receive user registration information sent by a device of the OTT SP or a business and operation support system BOSS; and the processor is specifically configured to generate first matching information according to the user registration information, where the first matching information includes a correspondence between a user identifier and a service identifier.

With reference to any one of the first aspect or the foregoing possible implementation manners of the first aspect, in a fourth possible implementation manner of the first aspect, the processor is specifically configured to determine, according to the first matching information, whether there is a correspondence between the user identifier and the service identifier.

With reference to any one of the first aspect or the foregoing possible implementation manners of the first aspect, in a fifth possible implementation manner of the first aspect, the receiver is further configured to receive user registration information sent by a device of the OTT SP; and the transmitter is further configured to send the user registration information to a business and operation support system BOSS.

With reference to any one of the first aspect or the foregoing possible implementation manners of the first aspect, in a sixth possible implementation manner of the first aspect, the receiver is further configured to: obtain a service identifier and a charging identifier that are configured by an operator, and receive a service rule set sent by the device of the OTT SP; and the processor is further configured to generate second matching information according to the service rule set, where the second matching information includes a correspondence among a service rule set, a service identifier, and a charging identifier.

With reference to any one of the first aspect or the foregoing possible implementation manners of the first aspect, in a seventh possible implementation manner of the first aspect, the processor is further configured to determine, according to the second matching information, the service identifier and the charging identifier that are corresponding to the data flow.

With reference to any one of the first aspect or the foregoing possible implementation manners of the first aspect, in an eighth possible implementation manner of the first aspect, the receiver is further configured to: obtain a service identifier and a charging identifier that are configured by an operator, and receive a service rule set sent by a device of the OTT SP;

the transmitter is further configured to send the service identifier and the charging identifier to a policy and charging rules function PCRF; and the processor is further configured to generate third matching information according to the service rule set, where the third matching information includes a correspondence between a service rule set and a service identifier.

With reference to any one of the first aspect or the foregoing possible implementation manners of the first aspect, in a ninth possible implementation manner of the first aspect, the receiver is further configured to receive user registration information sent by the device of the OTT SP; and the transmitter is further configured to send the user registration information to the PCRF.

According to a second aspect, a policy and charging enforcement function PCEF is provided, where when user equipment UE accesses a service that charges an over the top OTT service provider SP, the PCEF includes:

a receiver, configured to receive a data flow sent by the UE;

a processor, configured to: parse the data flow, and determine flow description information of the data flow; and a transmitter, configured to send the flow description information determined by the processor to a charging control apparatus; where the receiver is further configured to receive a service identifier sent by the charging control apparatus, where the service identifier is determined by the charging control apparatus according to the flow description information; and the processor is further configured to perform online/offline charging for the service according to the service identifier received by the receiver.

With reference to the second aspect, in a first possible implementation manner of the second aspect, the receiver is further configured to receive a charging identifier sent by the charging control apparatus; and the processor is specifically configured to perform online/offline charging for the service according to the service identifier and the charging identifier.

With reference to the second aspect, in a second possible implementation manner of the second aspect, the processor is further configured to determine whether the UE registers for the service; and the transmitter is specifically configured to: when the processor determines that the UE registers for the service, send the flow description information to the charging control apparatus.

According to a third aspect, a policy and charging rules function PCRF is provided, including:

a receiver, configured to: receive a service identifier and a charging identifier from a charging control apparatus, and receive user registration information from the charging control apparatus or a business and operation support system BOSS; and a processor, configured to generate a policy and charging control PCC policy according to the user registration information, the service identifier, and the charging identifier that are received by the receiver.

According to a fourth aspect, a business and operation support system BOSS is provided, including:

a receiver, configured to receive user registration information; and a transmitter, configured to send the user registration information received by the receiver to a charging control apparatus.

With reference to the fourth aspect, in a first possible implementation manner of the fourth aspect, when a service that charges an over the top OTT service provider SP is a backward charging service, the receiver is specifically configured to receive the user registration information from a device of the OTT SP; or when a service that charges an over the top OTT service provider SP is a forward charging service, the receiver is specifically configured to receive the user registration information from user equipment UE.

According to a fifth aspect, a device of an over the top OTT service provider SP is provided, including:

a processor, configured to generate a service rule set; and a transmitter, configured to send the service rule set to a charging control apparatus.

With reference to the fifth aspect, in a first possible implementation manner of the fifth aspect, when a service that charges the OTT SP is a backward charging service, the processor is further configured to generate user registration information; and the transmitter is further configured to send the user registration information to the charging control apparatus or a business and operation support system BOSS.

According to a sixth aspect, a charging system is provided, including:

the charging control apparatus according to any one of the first aspect or the possible implementation manners of the first aspect;

a policy and charging enforcement function PCEF;

a policy and charging rules function PCRF; and a business and operation support system BOSS.

According to a seventh aspect, a charging method is provided, where when user equipment UE accesses a service that charges an over the top OTT service provider SP, the method includes:

receiving flow description information from a policy and charging enforcement function PCEF, where the flow description information is obtained by the PCEF according to a data flow received from the UE;

determining, according to the flow description information, a service identifier corresponding to the data flow; and sending the service identifier to the PCEF, so that the PCEF charges for the service according to the service identifier.

With reference to the seventh aspect, in a first possible implementation manner of the seventh aspect, the determining, according to the flow description information, a service identifier corresponding to the data flow includes:

determining, according to the flow description information, the service identifier and a charging identifier that are corresponding to the data flow; and the sending the service identifier to the PCEF includes:

sending the service identifier and the charging identifier to the PCEF.

With reference to the first possible implementation manner of the seventh aspect, in a second possible implementation manner of the seventh aspect, the method further includes: receiving a user identifier of the UE from the PCEF; and determining whether there is a correspondence between the user identifier and the service identifier; where the sending the service identifier and the charging identifier to the PCEF includes:

when it is determined that there is a correspondence between the user identifier and the service identifier, sending the service identifier and the charging identifier to the PCEF.

With reference to any one of the seventh aspect or the possible implementation manners of the seventh aspect, in a third possible implementation manner of the seventh aspect, before the receiving flow description information from a PCEF, the method further includes:

receiving user registration information sent by a device of the OTT SP or a business and operation support system BOSS; and generating first matching information according to the user registration information, where the first matching information includes a correspondence between a user identifier and a service identifier.

With reference to any one of the seventh aspect or the possible implementation manners of the seventh aspect, in a fourth possible implementation manner of the seventh aspect, the determining whether there is a correspondence between the user identifier and the service identifier includes:

determining, according to the first matching information, whether there is a correspondence between the user identifier and the service identifier.

With reference to any one of the seventh aspect or the possible implementation manners of the seventh aspect, in a fifth possible implementation manner of the seventh aspect, before the receiving flow description information from a PCEF, the method further includes:

receiving user registration information sent by a device of the OTT SP; and sending the user registration information to a business and operation support system BOSS.

With reference to any one of the seventh aspect or the possible implementation manners of the seventh aspect, in a sixth possible implementation manner of the seventh aspect, before the receiving flow description information from a PCEF, the method further includes:

obtaining a service identifier and a charging identifier that are configured by an operator, and receiving a service rule set sent by the device of the OTT SP; and generating second matching information according to the service rule set, where the second matching information includes a correspondence among a service rule set, a service identifier, and a charging identifier.

With reference to any one of the seventh aspect or the possible implementation manners of the seventh aspect, in a seventh possible implementation manner of the seventh aspect, the determining, according to the flow description information, the service identifier and a charging identifier that are corresponding to the data flow includes:

determining, according to the second matching information, the service identifier and the charging identifier that are corresponding to the data flow.

With reference to any one of the seventh aspect or the possible implementation manners of the seventh aspect, in an eighth possible implementation manner of the seventh aspect, before the receiving flow description information from a PCEF, the method further includes:

obtaining a service identifier and a charging identifier that are configured by an operator, and receiving a service rule set sent by a device of the OTT SP;

sending the service identifier and the charging identifier to a policy and charging rules function PCRF; and generating third matching information according to the service rule set, where the third matching information includes a correspondence between a service rule set and a service identifier.

With reference to any one of the seventh aspect or the possible implementation manners of the seventh aspect, in a ninth possible implementation manner of the seventh aspect, before the receiving flow description information from a PCEF, the method further includes:

receiving user registration information sent by the device of the OTT SP; and sending the user registration information to the PCRF.

According to an eighth aspect, a charging method is provided, where the method is performed by a policy and charging enforcement function PCEF, and when user equipment UE accesses a service that charges an over the top OTT service provider SP, the method includes:

receiving a data flow sent by the UE;

parsing the data flow, and determining flow description information of the data flow;

sending the flow description information to a charging control apparatus;

receiving a service identifier sent by the charging control apparatus, where the service identifier is determined by the charging control apparatus according to the flow description information; and performing online/offline charging for the service according to the service identifier.

With reference to the eighth aspect, in a first possible implementation manner of the eighth aspect, the receiving a service identifier sent by the charging control apparatus includes:

receiving the service identifier and a charging identifier that are sent by the charging control apparatus, where the service identifier and the charging identifier are determined by the charging control apparatus according to the flow description information; and the performing online/offline charging for the service according to the service identifier includes:

performing online/offline charging for the service according to the service identifier and the charging identifier.

With reference to the eighth aspect, in a second possible implementation manner of the eighth aspect, before the sending the flow description information to a charging control apparatus, the method further includes:

determining whether the UE registers for the service; and the sending the flow description information to a charging control apparatus includes:

when the UE registers for the service, sending the flow description information to the charging control apparatus.

According to a ninth aspect, a charging method is provided, where the method is performed by a policy and charging rules function PCRF, and the method includes:

receiving a service identifier and a charging identifier from a charging control apparatus, and receiving user registration information from the charging control apparatus or a business and operation support system BOSS; and generating a policy and charging control PCC policy according to the user registration information, the service identifier, and the charging identifier.

According to a tenth aspect, a charging method is provided, where the method is performed by a business and operation support system BOSS, and the method includes:

receiving user registration information; and sending the user registration information to a charging control apparatus.

With reference to the tenth aspect, in a first possible implementation manner of the tenth aspect, when a service that charges an over the top OTT service provider SP is a backward charging service, the receiving user registration information includes:

receiving the user registration information from a device of the OTT SP; or when a service that charges an over the top OTT service provider SP is a forward charging service, the receiving user registration information includes:

receiving the user registration information from user equipment UE.

According to an eleventh aspect, a charging method is provided, where the method is performed by a device of an over the top OTT service provider SP, and the method includes:

generating a service rule set; and sending the service rule set to a charging control apparatus.

With reference to the eleventh aspect, in a first possible implementation manner of the eleventh aspect, when a service that charges the OTT SP is a backward charging service, the method further includes:

generating user registration information; and sending the user registration information to the charging control apparatus or a business and operation support system BOSS.

In the embodiments of the present invention, when UE accesses a service, a PCEF may obtain a service identifier from a charging control apparatus. In this way, without the need of configuring the service identifier and a charging identifier on the PCEF, the PCEF can obtain the service identifier and the charging identifier that are corresponding to a data flow. Therefore, a configuration workload can be decreased.

BRIEF DESCRIPTION OF DRAWINGS

To describe the technical solutions in the embodiments of the present invention more clearly, the following briefly introduces the accompanying drawings required for describing the embodiments. It should be noted that, these accompanying drawings merely show some embodiments of the present invention, and a person of ordinary skill in the art can derive other drawings from these accompanying drawings without creative efforts.

DESCRIPTION OF EMBODIMENTS

The technical solutions according to embodiments of the present invention are clearly described in the following with reference to the accompanying drawings. It should be noted that these embodiments are merely examples, and are not intended to limit the protection scope of the present invention. All other embodiments obtained by a person of ordinary skill in the art based on these embodiments without creative efforts shall fall within the protection scope of the present invention.

Figure 1:
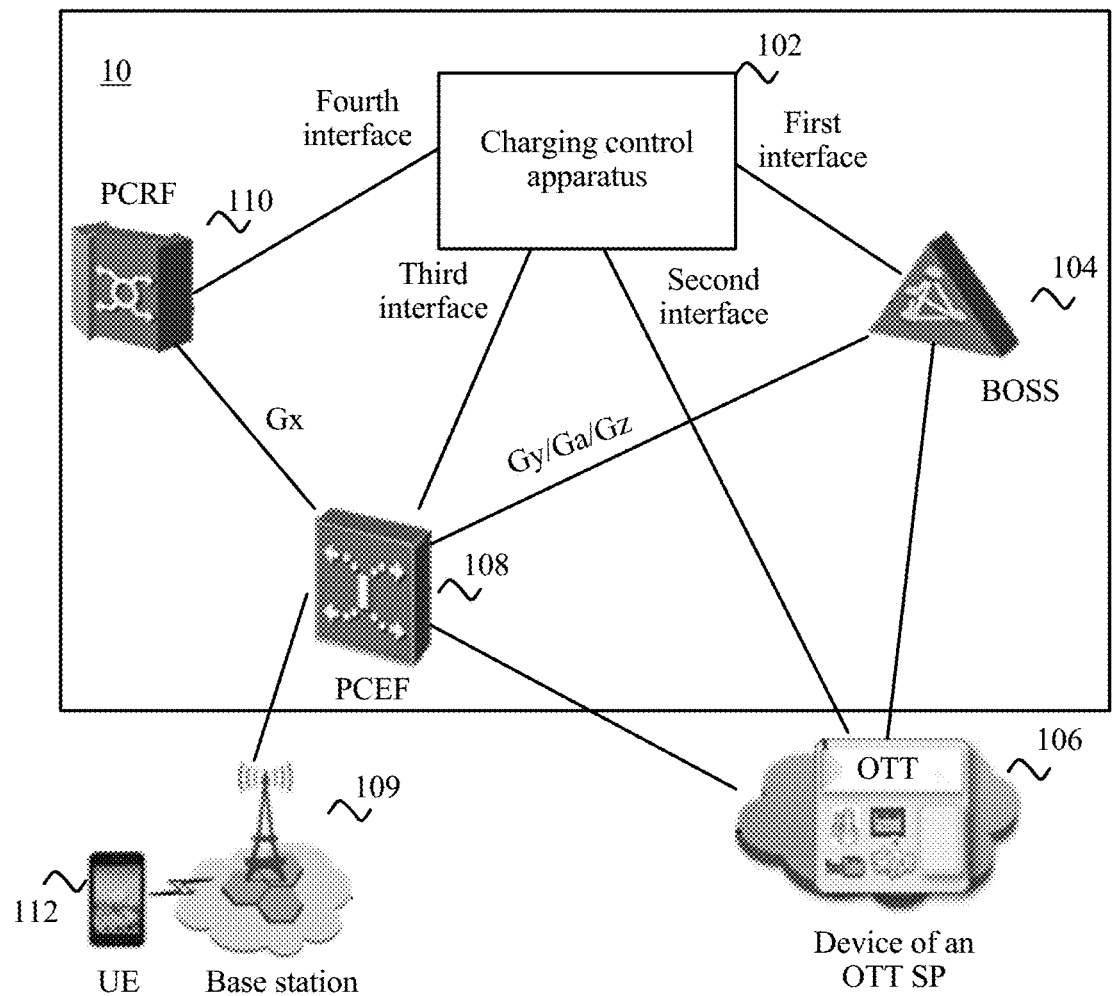
FIG. 1 is a frame diagram of a system or a network according to an embodiment of the present invention.

FIG. 1 is a frame diagram of a system or a network according to an embodiment of the present invention. A system 10 shown in FIG. 1 includes a charging control apparatus 102, a Policy and Charging Enforcement Function (PCEF) 108, a Policy and Charging Rules Function (PCRF) 110, and a Business & Operation Support System (BOSS) 104.

In addition, FIG. 1 further shows a device 106 of an Over The Top (OTT) Service Provider (SP), a base station 109, and user equipment (UE) 112.

In the embodiments of the present invention, the UE may be referred to as a terminal, a subscriber unit, a subscriber station, a mobile station, a remote station, a remote terminal, a mobile device, a user terminal, a mobile terminal, a wireless communications device, a user agent, or a user apparatus. For example, the UE may be a cellular phone, a cordless telephone set, a Session Initiation Protocol (SIP) phone, a Wireless Local Loop (WLL) station, a personal digital assistant (PDA), a handheld device that has a wireless communications function, a computing device, or another processing device connected to a wireless modem. This is not limited in the present invention.

The system 10 shown in FIG. 1 is used to perform charging for a service that charges the OTT SP. The service that charges the OTT SP may be referred to as a traffic 800 service or a corporate payment service.

The PCRF 110 may decide a charging and control policy for a user according to subscription information of the user and deliver the policy to the PCEF 108. The PCEF 108 may be responsible for receiving charging and control policies authorized by the PCRF 110 to users and implementing the charging and control policies. The BOSS 104 is located in a network of an operator, and may be responsible for subscription management of a user package and implement an online/offline charging function.

The charging control apparatus 102 may be referred to as a traffic 800 service platform, or referred to as a traffic 800 platform. The charging control apparatus 102 may have a first interface, a second interface, a third interface, and a fourth interface. The charging control apparatus 102 may communicate with the BOSS 104 by using the first interface; communicate with the device 106 of the OTT SP by using the second interface; communicate with the PCEF 108 by using the third interface; and communicate with the PCRF 110 by using the fourth interface.

Optionally, the charging control apparatus 102 may include an interface processing unit configured to manage the first interface, the second interface, the third interface, and the fourth interface. For example, the interface processing unit may be implemented by a processor in the charging control apparatus 102.

The BOSS 104 may have a corresponding BOSS interface to communicate with the charging control apparatus 102. The device 106 of the OTT SP may have a corresponding interface to communicate with the charging control apparatus 102. For example, the corresponding interface of the device of the OTT SP may be an interface on a server of the OTT SP. The PCEF 108 may have a corresponding PCEF interface to communicate with the charging control apparatus 102. In addition, the PCEF has enabled a service awareness (SA) function. The PCRF 110 may have a corresponding PCRF interface to communicate with the charging control apparatus 102.

In addition, the PCRF 110 may communicate with the PCEF 108 by using a Gx interface. The PCEF 108 may communicate with the BOSS 104 by using a Gy/Ga/Gz interface.

The device 106 of the OTT SP may be an OTT server, and the device 106 of the OTT SP has functions of authentication, user group management, and the like.

Figure 2:
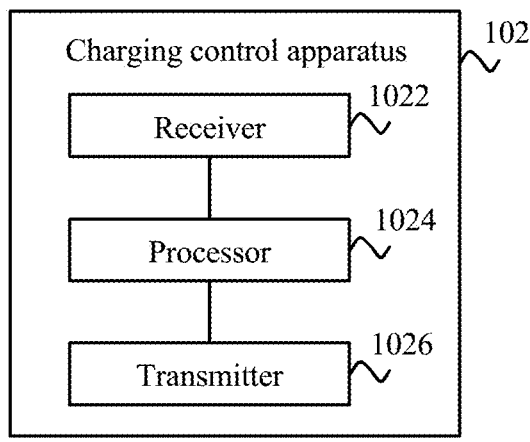
FIG. 2 is a schematic structural diagram of a charging control apparatus according to an embodiment of the present invention.

As shown in FIG. 2, the charging control apparatus 102 may include a receiver 1022, a processor 1024, and a transmitter 1026.

Figure 3:
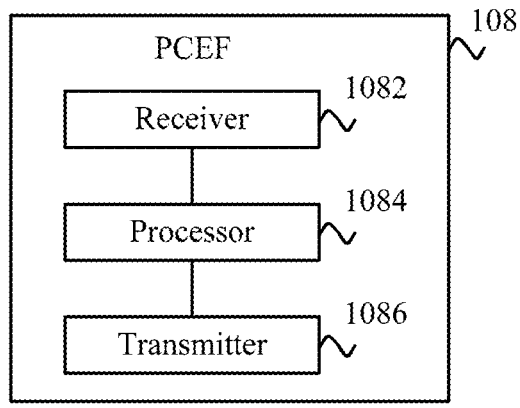
FIG. 3 is a schematic structural diagram of a PCEF according to an embodiment of the present invention.

As shown in FIG. 3, the PCEF 108 may include a receiver 1082, a processor 1084, and a transmitter 1086.

Figure 4:
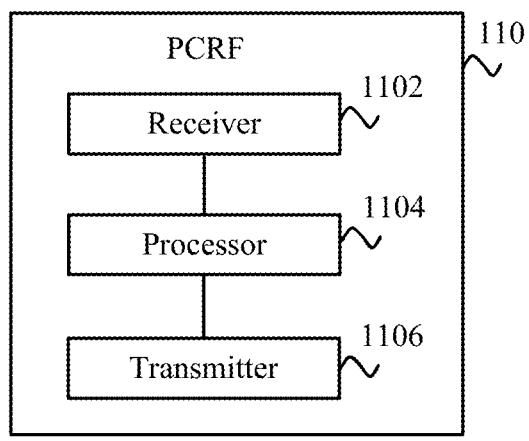
FIG. 4 is a schematic structural diagram of a PCRF according to an embodiment of the present invention.

As shown in FIG. 4, the PCRF 110 may include a receiver 1102, a processor 1104, and a transmitter 1106.

Figure 5:
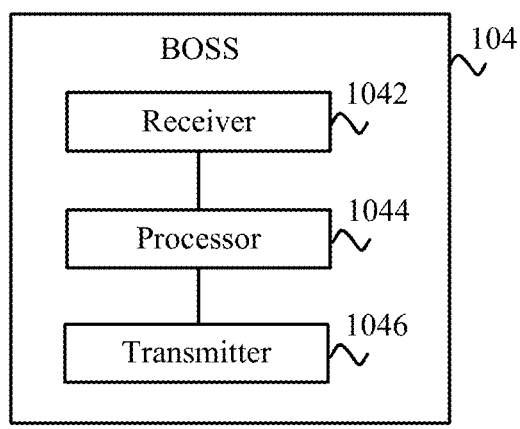
FIG. 5 is a schematic structural diagram of a BOSS according to an embodiment of the present invention.

As shown in FIG. 5, the BOSS 104 may include a receiver 1042, a processor 1044, and a transmitter 1046.

Figure 6:
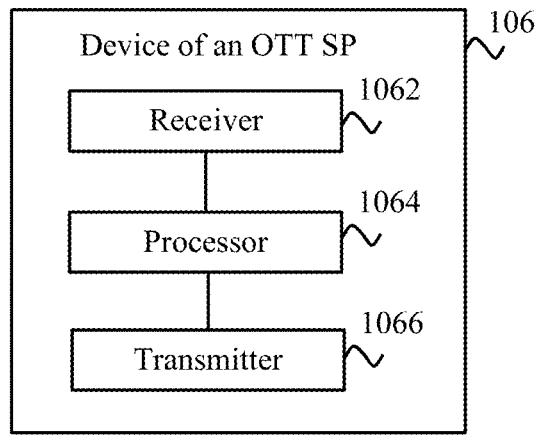
FIG. 6 is a schematic structural diagram of a device of an OTT SP according to an embodiment of the present invention.

As shown in FIG. 6, the device 106 of the OTT SP may include a receiver 1062, a processor 1064, and a transmitter 1066.

In this embodiment of the present invention, when the UE 112 accesses a service, the UE 112 sends a data flow to the PCEF 108 by using the base station 109. Further, the system shown in FIG. 1 may be used to complete a charging operation for the service. The service may be a service that charges the OTT SP, that is, the service is a traffic 800 service.

Figure 7:
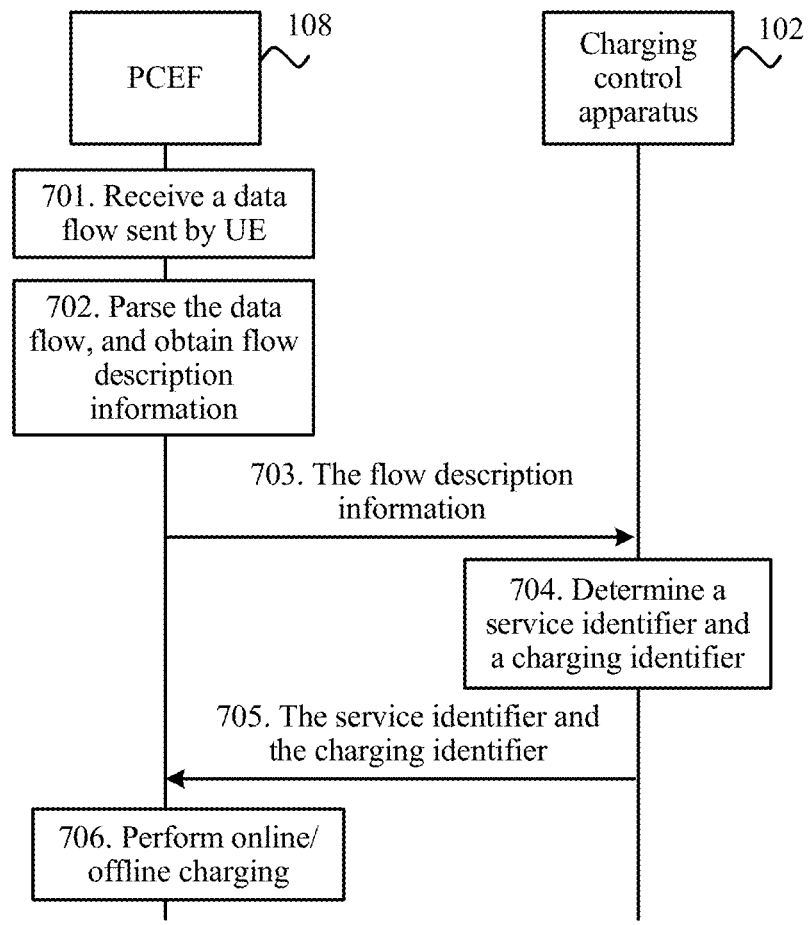
FIG. 7 is a signaling flowchart of a charging method according to an embodiment of the present invention.

FIG. 7 is a signaling flowchart of a charging method according to an embodiment of the present invention. The method shown in FIG. 7 includes the following steps.

701. A receiver 1082 of a PCEF 108 receives a data flow sent by UE 112.

When the UE 112 accesses a traffic 800 service, the UE 112 may send the data flow to the PCEF 108. The data flow may be a data flow of a service that charges an OTT SP.

Optionally, before step 701, the UE 112 sends a user activation request to the PCEF 108. After receiving the user activation request of the UE 112, the PCEF 108 obtains a Policy Control and Charging, (PCC) policy from a PCRF 110. The PCRF 110 performs policy authorization, and delivers a dynamic rule to the PCEF 108. The PCEF 108 performs policy installation according to the dynamic rule, and sends a user activation success answer message to the UE 112.

702. A processor 1084 of the PCEF 108 parses the data flow, and obtains flow description information of the data flow.

Parsing the data flow may include identifying L3/4 information, L7 information, and the like of the data flow. The L3/4 information may include an Internet Protocol (IP) address, a port number, a protocol number, and the like. The L7 information may include: a URL address, an L7 protocol type, and the like.

The flow description information may include the L3/4 information and/or the L7 information and/or the like of the data flow.

703. A transmitter 1086 of the PCEF 108 sends the flow description information to a charging control apparatus 102.

704. A processor 1024 of the charging control apparatus 102 determines, according to the flow description information, a service identifier and a charging identifier of a service that charges an OTT SP.

For example, the service identifier may be a Service ID of the service, and the charging identifier may be a rating group (RG).

The charging control apparatus 102 may store second matching information, and the second matching information includes a correspondence among a service rule set, a service identifier, and a charging identifier. For example, each service rule set may include L3/4 information, L7 information, and the like. The L3/4 information may include an IP address, a port number, a protocol number, and the like; and the L7 information may include a URL address, an L7 protocol type, and the like. This is not limited in the present invention. In addition, the service rule set may be referred to as a filtering rule information set.

In this way, if the flow description information belongs to a service rule set, a service identifier and a charging identifier that are corresponding to the service rule set may be determined according to the second matching information, and the service identifier and the charging identifier that are corresponding to the service rule set are respectively determined as a service identifier and a charging identifier that are corresponding to the flow description information, that is, a service identifier and a charging identifier that are corresponding to the data flow.

705. A transmitter 1026 of the charging control apparatus 102 sends a service identifier and a charging identifier that are corresponding to the data flow to the PCEF 108, so that the PCEF 108 charges for the service according to the service identifier and the charging identifier.

In this embodiment of the present invention, when the UE 112 accesses a traffic 800 service, the PCEF 108 sends flow description information to the charging control apparatus 102, and the charging control apparatus 102 determines a service identifier and a charging identifier that are corresponding to a data flow and sends the service identifier and the charging identifier to the PCEF 108. In this way, without the need of configuring the service identifier and the charging identifier on the PCEF 108, the PCEF 108 can obtain the service identifier and the charging identifier that are corresponding to the data flow. Therefore, a configuration workload of the PCEF 108 can be decreased.

706. The processor 1084 of the PCEF 108 performs online/offline charging according to the service identifier and the charging identifier. The charging is performed for a service that has the service identifier.

The PCEF 108 and a BOSS 104 may jointly implement an online/offline charging function. After step 706, the following steps (not shown in FIG. 7) may be further included.

707. The transmitter 1086 of the PCEF 108 sends a credit control request (CCR) message to the BOSS 104.

The CCR message may include the service identifier, the charging identifier, and a user identifier of the UE 112. The user identifier may be a (Mobile Subscriber International ISDN (integrated services digital network)/PSTN (public switched telephone network) number, MSISDN). For example, the user identifier may be a phone number.

708. A processor 1044 of the BOSS 104 performs differentiated rating.

The BOSS 104 may determine, according to user registration information, whether the UE 112 registers for the service that has the service identifier, and further determine whether to charge the UE 112 for the service or the service is free of charge for the UE 112.

The BOSS 104 may perform fee deduction processing on a user account of the UE 112 according to the charging identifier. For example, different charging identifiers may correspond to different prices.

If the service that charges the OTT SP is a backward charging service, that is, the service is totally paid for by the OTT SP, the user registration information is provided by a device of the OTT SP. If the service is a forward charging service, that is, in addition to the OTT SP, the UE also needs to pay, the user registration information is generated when the user subscribes to the service in the BOSS system.

709. A transmitter 1046 of the BOSS 104 sends a credit control answer (CCA) message to the PCEF 108.

In this way, the PCEF 108 and the BOSS 104 may jointly complete online/offline charging.

Figure 8:
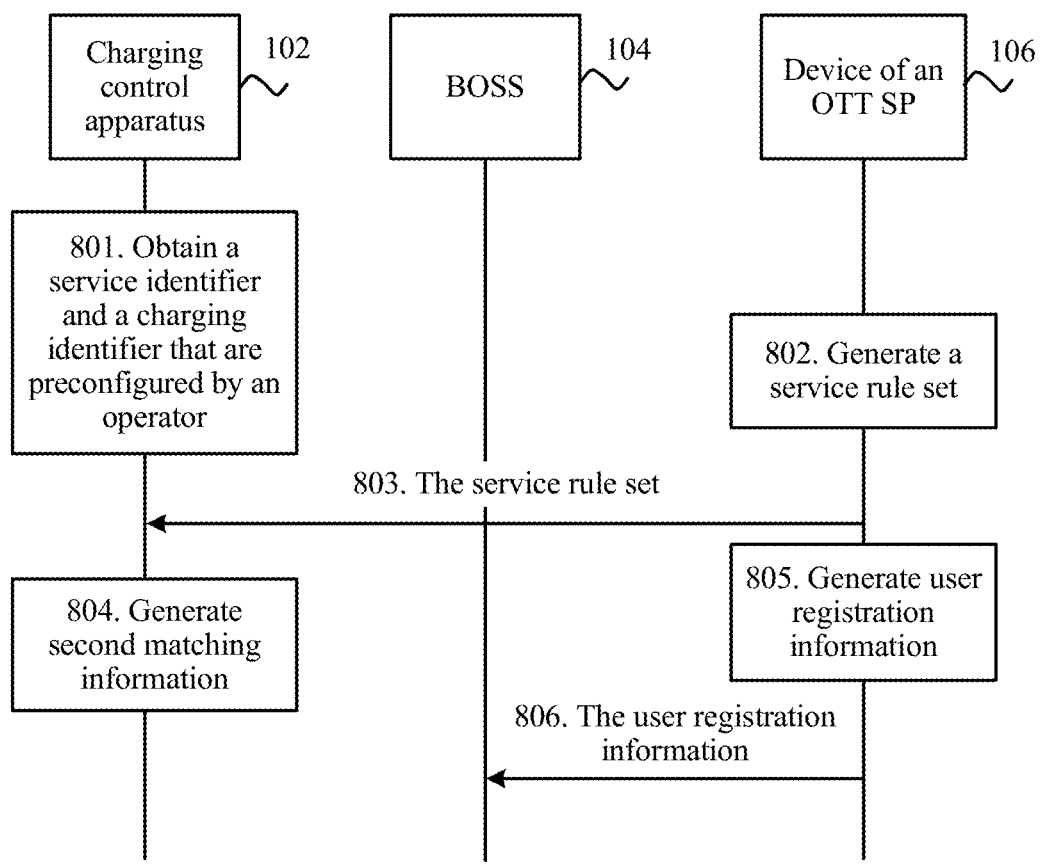
FIG. 8 is a signaling flowchart of a charging method according to another embodiment of the present invention.

Optionally, in an embodiment, if the service that charges the OTT SP is a backward charging service, before the method shown in FIG. 7 is performed, a method shown in FIG. 8 may be further included. The method shown in FIG. 8 includes the following steps.

801. A receiver 1022 of a charging control apparatus 102 obtains a service identifier and a charging identifier that are preconfigured by an operator.

The operator plans a service identifier and a charging identifier for a service that charges an OTT SP, and preconfigures the service identifier and the charging identifier on the charging control apparatus 102.

802. A processor 1064 of a device 106 of an OTT SP generates a service rule set.

The service rule set may include L3/4 information, L7 information, and the like. The L3/4 information may include an IP address, a port number, a protocol number, and the like; and the L7 information may include a URL address, an L7 protocol type, and the like. This is not limited in the present invention.

803. A transmitter 1066 of the device 106 of the OTT SP sends the service rule set to the charging control apparatus 102.

The device 106 of the OTT SP may send service rule sets in batches to the charging control apparatus 102 in a form of a file, or the device 106 of the OTT SP may provide or update the service rule set in real time.

804. A processor 1024 of the charging control apparatus 102 generates second matching information according to the service rule set. The second matching information includes a correspondence among a service rule set, a service identifier, and a charging identifier.

For example, the second matching information may be in a form of a second matching table. The second matching table may include three columns. The first column includes service identifiers, the second column includes charging identifiers, and the third column includes service rule sets. In addition, there is a correspondence among a service rule set, a service identifier, and a charging identifier that are in a same row in the second matching table.

805. The processor 1064 of the device 106 of the OTT SP generates user registration information.

The user registration information may include a correspondence between a user identifier and a service identifier. For example, it is assumed that a user identifier of first UE is A1, and a service identifier of a first service is B1. If the device 106 of the OTT SP decides that the first service is free of charge for the first UE, the user registration information may include a correspondence between A1 and B1.

806. The transmitter 1066 of the device 106 of the OTT SP sends the user registration information to a BOSS 104.

It should be noted that serial numbers herein should not be construed as a limitation on a sequence. For example, step 802 and step 803 may be performed before step 801. For example, step 805 may be performed before step 802, or step 805 and step 802 may be simultaneously performed. This is not limited in the present invention.

It should be understood that, in the embodiment shown in FIG. 8, the charging control apparatus 102 may receive, from devices of multiple different OTT SPs, service rule sets that are respectively sent by the devices. The BOSS 104 may receive, from devices of multiple different OTT SPs, user registration information that is respectively sent by the devices.

For example, it is assumed that the devices of the OTT SPs include a device of a first OTT SP and a device of a second OTT SP. The device of the first OTT SP is a server of Alibaba, and the device of the second OTT SP is a server of KooWo. In addition, services provided by Alibaba include Taobao and Alipay. Services provided by KooWo include Kwmusic.

Therefore, in step 801, the operator may configure the following information on the charging control apparatus 102:

A service identifier of Taobao is a first service identifier, and a corresponding charging identifier is a first charging identifier.

A service identifier of Alipay is a second service identifier, and a corresponding charging identifier is a second charging identifier.

A service identifier of Kwmusic is a third service identifier, and a corresponding charging identifier is a third charging identifier.

In step 802, the device of the first OTT SP may generate a first service rule set and a second service rule set. The first service rule set is used to represent Taobao, and the second service rule set is used to represent Alipay. The device of the second OTT SP may generate a third service rule set. The third service rule set is used to represent Kwmusic.

In step 803, the device of the first OTT SP sends the first service rule set to the charging control apparatus 102. The device of the second OTT SP sends the second service rule set to the charging control apparatus 102.

In step 804, the second matching information generated by the charging control apparatus 102 may be shown in Table 1.

TABLE 1

| First service identifier | First charging identifier | First service rule set |
|---|---|---|
| Second service identifier | Second charging identifier | Second service rule set |
| Third service identifier | Third charging identifier | Third service rule set |

In addition, after the method shown in FIG. 8 is performed, and before the method shown in FIG. 7 is performed, an operation may be further included: A PCEF 108 builds a local cache.

For example, that a PCEF 108 builds a local cache may include the following steps.

(1) When a board of the PCEF 108 is enabled, a link to the charging control apparatus 102 is first established. For example, the link may be an Internet Content Adaptation Protocol (ICAP) link.

(2) After the ICAP link is successfully established, the PCEF 108 may send a first request message to the charging control apparatus 102. The first request message may carry a first identifier, and the first identifier is used to indicate that the PCEF 108 supports a cache function.

(3) After receiving the first request message, the charging control apparatus 102 checks a status of the service rule set on the charging control apparatus 102. If the status is normal, the charging control apparatus 102 sends a first answer message to the PCEF 108. The first answer message may carry a second identifier, the second identifier may be a Ready identifier, and the Ready identifier is used to indicate that a status of a service rule search tree on the charging control apparatus 102 is normal.

(4) After receiving the first answer message, the PCEF 108 may send a second request message to the charging control apparatus 102. The second request message may carry a start-stop serial number segment of a rule that is requested to be delivered.

For example, the start-stop serial number segment may be from 1 to 10.

(5) The charging control apparatus 102 sorts service rules in the service rule set according to popularity. After receiving the second request message, the charging control apparatus 102 sends the service rule and a second answer message to the PCEF 108 according to the start-stop serial number segment.

For example, if the service rule set on the charging control apparatus 102 includes 100 service rules, the charging control apparatus 102 may send top 10 highest-popularity service rules to the PCEF 108.

For example, if the service rule set on the charging control apparatus 102 includes seven service rules, the charging control apparatus 102 may send the seven service rules to the PCEF 108 and add a Total identifier to the second answer message.

(6) After receiving the service rule that includes the start-stop serial number segment from the charging control apparatus 102 or after receiving a Total identifier from the charging control apparatus 102, the PCEF 108 builds a local rule tree. In this way, the PCEF 108 may complete building of the local cache.

It should be noted that the PCEF 108 may build the local cache in another manner, and this is not limited in the present invention.

After the local cache is built, in step 703 shown in FIG. 7, the processor 1084 of the PCEF 108 may first search the local cache, and when no service rule can be found, the transmitter 1086 then sends the flow description information to the charging control apparatus 102. In this way, times of communication between the PCEF 108 and the charging control apparatus 102 can be decreased, and pressure on an interface between the PCEF 108 and the charging control apparatus 102 is further lowered.

Figure 9:
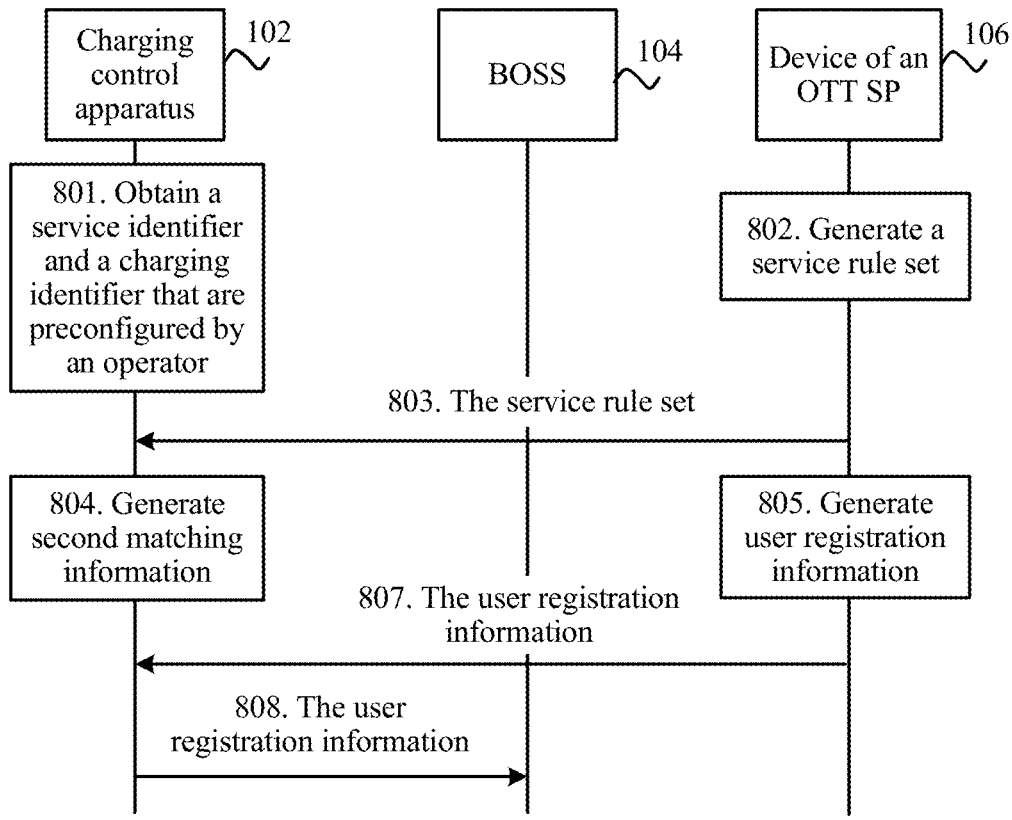
FIG. 9 is a signaling flowchart of a charging method according to another embodiment of the present invention.

Optionally, in another embodiment, if the service that charges the OTT SP is a backward charging service, before the method shown in FIG. 7 is performed, a method shown in FIG. 9 may be further included. The method shown in FIG. 9 includes: step 801, step 802, step 803, step 804, step 805, and the following steps.

807. A transmitter 1066 of a device 106 of an OTT SP sends user registration information to a charging control apparatus 102.

808. A transmitter 1026 of the charging control apparatus 102 sends the user registration information to a BOSS 104.

In the embodiment shown in FIG. 9, the user registration information is sent by the device 106 of the OTT SP to the BOSS 104 by using the charging control apparatus 102. Alternatively, in other words, the charging control apparatus 102 forwards the user registration information received from the device 106 of the OTT SP to the BOSS 104. In this way, working pressure on an interface between the device 106 of the OTT SP and the BOSS 104 can be lowered.

For step 801 to step 805 in FIG. 9, refer to descriptions in FIG. 8. To avoid repetition, details are not described herein again.

It should be noted that serial numbers herein should not be construed as a limitation on a sequence. For example, step 804 may be performed after step 807 and step 808. This is not limited in the present invention.

Figure 10:
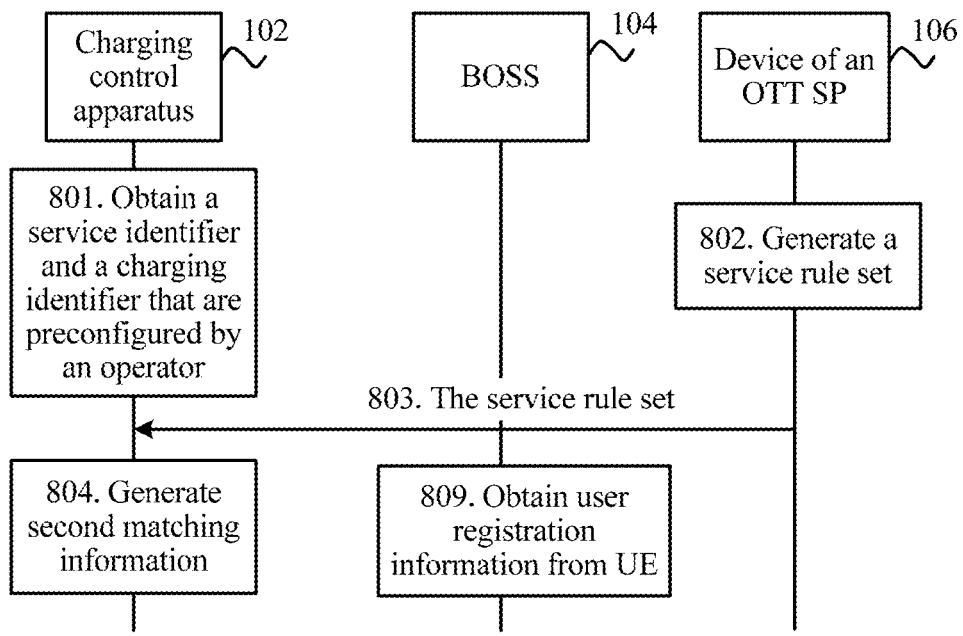
FIG. 10 is a signaling flowchart of a charging method according to another embodiment of the present invention.

Optionally, in another embodiment, if the service that charges the OTT SP is a forward charging service, before the method shown in FIG. 7 is performed, a method shown in FIG. 10 may be further included. The method shown in FIG. 10 includes: step 801, step 802, step 803, step 804, and the following step:

809. A receiver 1042 of a BOSS 104 obtains user registration information from UE 112.

The UE 112 may proactively register with an operator by means of a short message service message, a phone call, an operation on a network, or the like, and provide the user registration information. For example, a user identifier of second UE is A2, and a service identifier of a second service is B2. If a second user registers for the second service, the second UE may proactively provide the user registration information to the BOSS 104, and the user registration information includes a correspondence between A2 and B2.

For step 801 to step 804 in FIG. 10, refer to descriptions in FIG. 8. To avoid repetition, details are not described herein again.

In the embodiments described in FIG. 7 to FIG. 10, when the UE 112 accesses a service that charges an OTT SP, a PCEF 108 sends flow description information to a charging control apparatus 102 to obtain a corresponding service identifier and charging identifier. In this way, without the need of configuring a service identifier and a charging identifier on the PCEF 108, a configuration workload on the PCEF 108 can be decreased, and a configuration error rate is further decreased.

Figure 11:
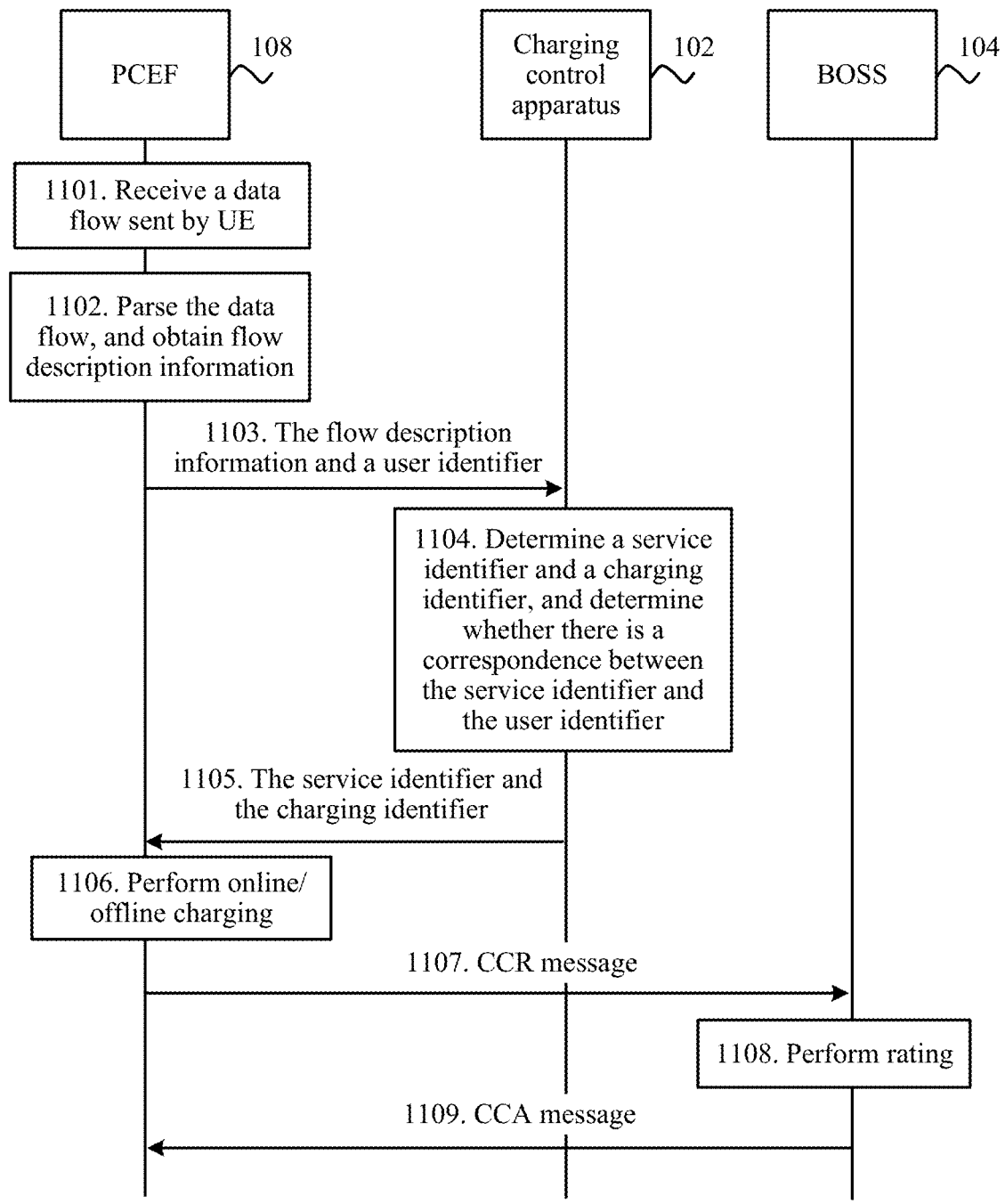
FIG. 11 is a signaling flowchart of a charging method according to another embodiment of the present invention.

FIG. 11 is a signaling flowchart of a charging method according to another embodiment of the present invention. The method shown in FIG. 11 includes the following steps.

1101. A receiver 1082 of a PCEF 108 receives a data flow sent by UE 112.

When the UE 112 accesses a traffic 800 service, the UE 112 may send the data flow to the PCEF 108. The data flow may be a data flow of a service that charges an OTT SP.

Optionally, before step 1101, the UE 112 sends a user activation request to the PCEF 108. After receiving the user activation request of the UE 112, the PCEF 108 obtains a PCC policy from a PCRF 110. The PCRF 110 performs policy authorization, and delivers a dynamic rule to the PCEF 108. The PCEF 108 performs policy installation according to the dynamic rule, and sends a user activation success answer message to the UE 112.

1102. A processor 1084 of the PCEF 108 parses the data flow, and obtains flow description information of the data flow.

For step 1102, refer to step 702 in the foregoing embodiment of FIG. 7. To avoid repetition, details are not described herein again.

1103. A transmitter 1086 of the PCEF 108 sends the flow description information and a user identifier to a charging control apparatus 102.

The user identifier may be an MSISDN. For example, the user identifier may be a phone number of the UE 112.

1104. A processor 1024 of the charging control apparatus 102 determines, according to the flow description information, a service identifier and a charging identifier of a service that charges an OTT SP, and determines whether there is a correspondence between the service identifier and the user identifier.

For example, the service identifier may be a Service ID of the service, and the charging identifier may be an RG.

The charging control apparatus 102 may store second matching information, and the second matching information includes a correspondence among a service rule set, a service identifier, and a charging identifier.

In this way, if the flow description information belongs to a service rule set, a service identifier and a charging identifier that are corresponding to the service rule set may be determined according to the second matching information, and the service identifier and the charging identifier that are corresponding to the service rule set are respectively determined as a service identifier and a charging identifier that are corresponding to the flow description information, that is, a service identifier and a charging identifier that are corresponding to the data flow.

The charging control apparatus 102 may store first matching information, and the first matching information includes a correspondence between a service identifier and a user identifier.

In this way, the charging control apparatus 102 may determine, according to the first matching information, whether there is a correspondence between the user identifier received from the PCEF 108 and the service identifier determined according to the flow description information.

1105. When the processor 1024 of the charging control apparatus 102 determines in step 1104 that there is a correspondence between the user identifier received from the PCEF 108 and the service identifier determined according to the flow description information, a transmitter 1026 of the charging control apparatus 102 sends the service identifier and the charging identifier to the PCEF 108.

On another hand, if the processor 1024 of the charging control apparatus 102 determines in step 1104 that there is no correspondence between the user identifier received from the PCEF 108 and the service identifier determined according to the flow description information, a transmitter 1026 of the charging control apparatus 102 may send a null message or no message to the PCEF 108.

In this embodiment of the present invention, when the UE 112 accesses a service, the PCEF 108 sends flow description information to the charging control apparatus 102, and the charging control apparatus 102 determines a service identifier and a charging identifier that are corresponding to a data flow and sends the service identifier and the charging identifier to the PCEF 108. In this way, without the need of configuring the service identifier and the charging identifier on the PCEF 108, the PCEF 108 can obtain the service identifier and the charging identifier that are corresponding to the data flow. Therefore, a configuration workload can be decreased.

1106. The processor 1084 of the PCEF 108 performs online/offline charging according to the service identifier and the charging identifier. The charging is performed for a service that has the service identifier.

It should be noted that, if the PCEF 108 receives a null message from the charging control apparatus 102 or the PCEF 108 does not receive, within preset duration, any message sent by the charging control apparatus 102, the PCEF 108 performs online/offline charging in a prior-art manner.

After receiving the service identifier and the charging identifier from the charging control apparatus 102, the PCEF 108 and a BOSS 104 may jointly implement an online/offline charging function. After step 1106 is performed, the following steps may be further included.

1107. The transmitter 1086 of the PCEF 108 sends a CCR message to the BOSS 104.

The CCR message may include the service identifier and the charging identifier.

1108. A processor 1044 of the BOSS 104 performs uniform rating for the service identifier.

That is, the BOSS 104 does not need to perform differentiated rating according to users. That is, in the embodiment shown in FIG. 11, the charging control apparatus 102 determines whether there is a correspondence between the service identifier and the user identifier, that is, the charging control apparatus 102 determines whether the user registers for the service that has the service identifier. In this way, the BOSS 104 may directly perform uniform rating without the need of receiving user registration information or determining, according to user registration information, whether the UE 112 registers for the traffic 800 service that has the service identifier. Therefore, a workload of the BOSS 104 can be decreased.

1109. A transmitter 1046 of the BOSS 104 sends a CCA message to the PCEF 108.

In this way, the PCEF 108 and the BOSS 104 may jointly complete online/offline charging.

Figure 12:
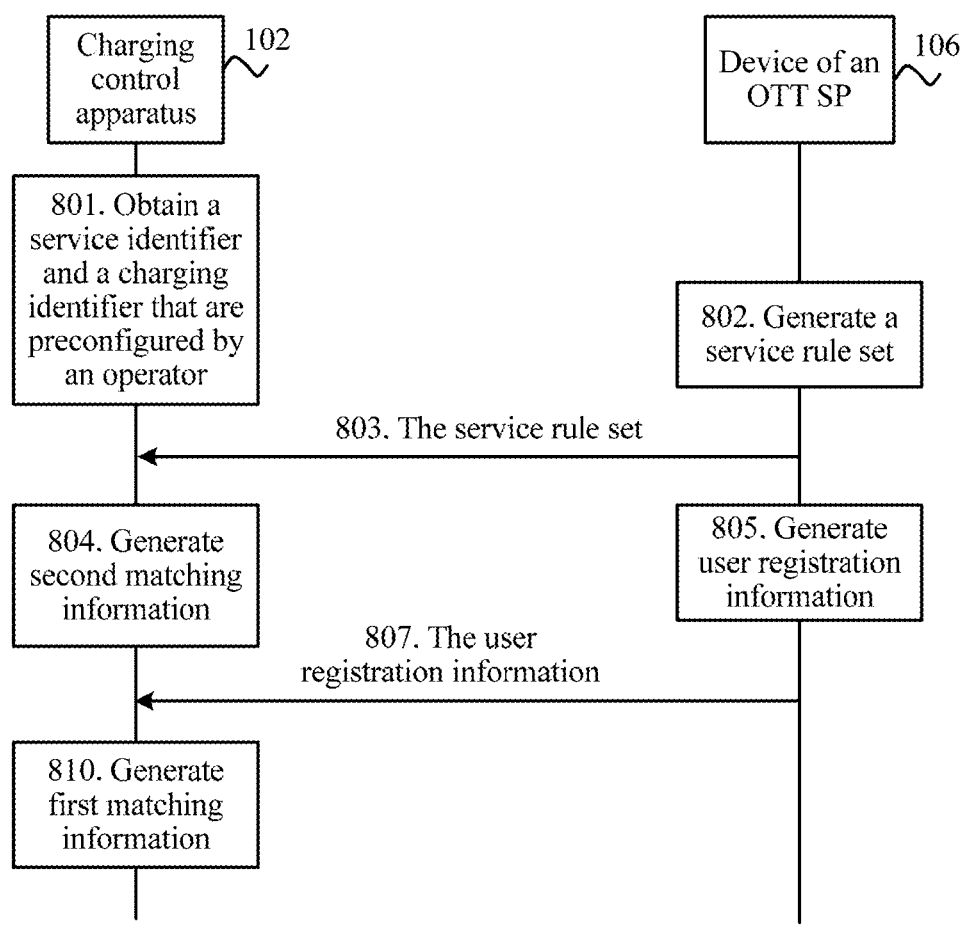
FIG. 12 is a signaling flowchart of a charging method according to another embodiment of the present invention.

Optionally, in an embodiment, if the service that charges the OTT SP is a backward charging service, before the method shown in FIG. 11 is performed, a method shown in FIG. 12 may be further included. The method shown in FIG. 12 includes: step 801, step 802, step 803, step 804, step 805, step 807, and the following steps.

810. A processor 1024 of a charging control apparatus 102 generates first matching information according to user registration information. The first matching information includes a correspondence between a service identifier and a user identifier.

For example, the first matching information may be in a form of a first matching table. The first matching table may include two columns. The first column includes service identifiers, and the second column includes user identifiers. In addition, there is a correspondence between a service identifier and a user identifier that are in a same row in the first matching table.

For example, the first matching information may be shown in Table 2.

TABLE 2

| First service identifier | First user identifier, second user identifier, and third user identifier |
|---|---|
| Second service identifier | Fourth user identifier |
| Third service identifier | Fifth user identifier |

For step 801 to step 805 in FIG. 12, refer to descriptions in FIG. 8, and for step 807 in FIG. 12, refer to descriptions in FIG. 9. To avoid repetition, details are not described herein again.

It should be noted that serial numbers herein should not be construed as a limitation on a sequence. For example, step 810 may be performed before step 804, or step 810 and step 804 may be simultaneously performed. This is not limited in the present invention.

Figure 13:
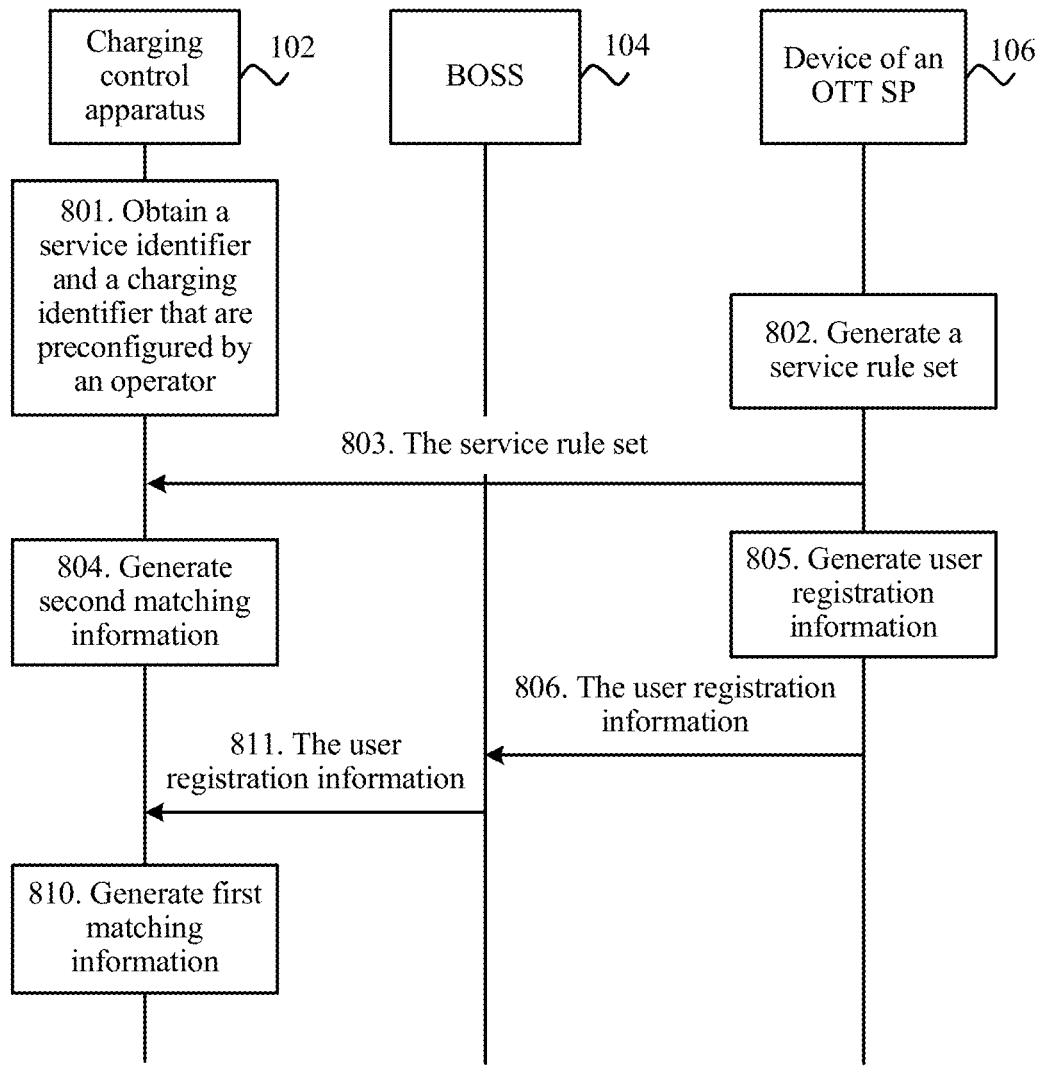
FIG. 13 is a signaling flowchart of a charging method according to another embodiment of the present invention.

Optionally, in another embodiment, if the service that charges the OTT SP is a backward charging service, before the method shown in FIG. 11 is performed, a method shown in FIG. 13 may be further included. The method shown in FIG. 13 includes: step 801, step 802, step 803, step 804, step 805, step 806, and the following steps:

811. A transmitter 1046 of a BOSS 104 sends user registration information to a charging control apparatus 102.

810. A processor 1024 of the charging control apparatus 102 generates first matching information.

For step 801 to step 806 in FIG. 13, refer to descriptions in FIG. 8, and for step 810 in FIG. 13, refer to descriptions in FIG. 12. To avoid repetition, details are not described herein again.

In this way, in the embodiment shown in FIG. 13, user registration information is sent by a device 106 of an OTT SP to the charging control apparatus 102 by using a BOSS 104. This can lower pressure on an interface between the device 106 of the OTT SP and the charging control apparatus 102.

Figure 14:
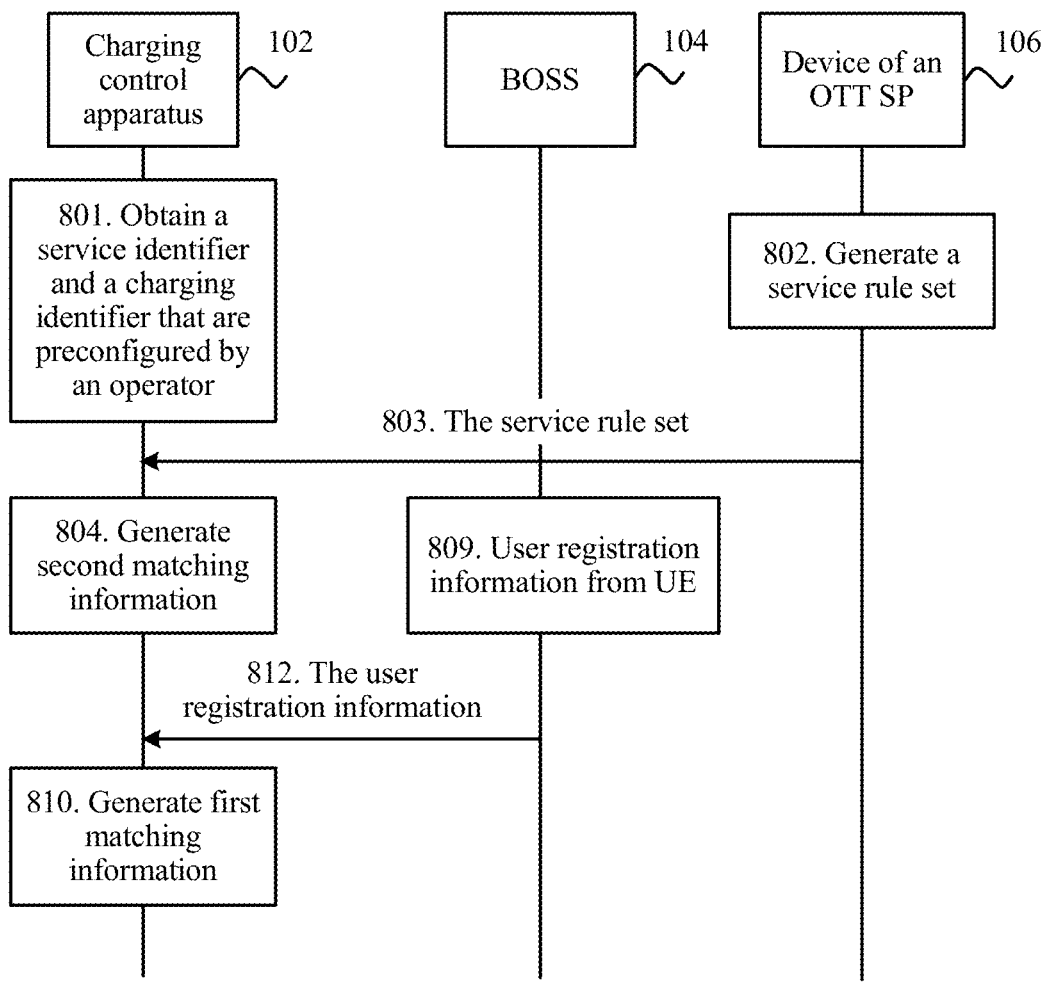
FIG. 14 is a signaling flowchart of a charging method according to another embodiment of the present invention.

Optionally, in another embodiment, if the service that charges the OTT SP is a forward charging service, before the method shown in FIG. 11 is performed, a method shown in FIG. 14 may be further included. The method shown in FIG. 14 includes: step 801, step 802, step 803, step 804, step 809, and the following steps:

812. A transmitter 1046 of a BOSS 104 sends user registration information to a charging control apparatus 102.

810. A processor 1024 of the charging control apparatus 102 generates first matching information.

For step 801 to step 804 in FIG. 14, refer to descriptions in FIG. 8; for step 809 in FIG. 14, refer to descriptions in FIG. 10; and for step 810 in FIG. 14, refer to descriptions in FIG. 12. To avoid repetition, details are not described herein again.

In the embodiments shown in FIG. 11 to FIG. 14, when UE 112 accesses a traffic 800 service, a PCEF 108 sends flow description information and a user identifier to the charging control apparatus 102. The charging control apparatus 102 determines a corresponding service identifier and charging identifier, and the charging control apparatus 102 determines whether there is a correspondence between the service identifier and the user identifier. When there is a correspondence, the PCEF 108 may receive the service identifier and the charging identifier that are sent by the charging control apparatus 102. In this way, the service identifier and the charging identifier do not need to be configured on the PCEF 108, a BOSS 104 does not need to perform user differentiation. Therefore, a configuration workload of the PCEF 108 and a configuration workload of the BOSS 104 can be decreased.

Figure 15:
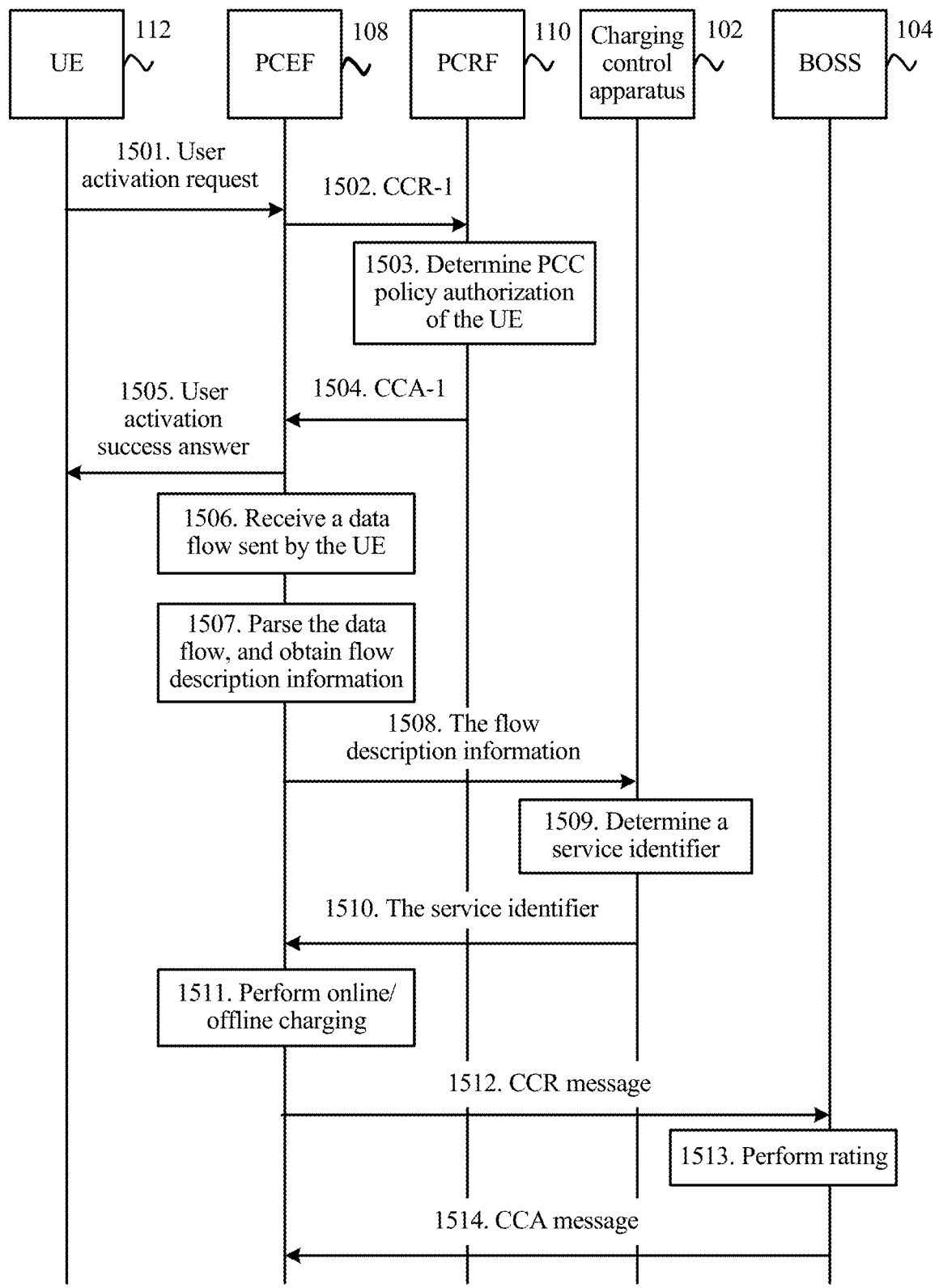
FIG. 15 is a signaling flowchart of a charging method according to another embodiment of the present invention.

FIG. 15 is a signaling flowchart of a charging method according to another embodiment of the present invention. When UE 112 accesses a service that charges an OTT SP, the method shown in FIG. 15 includes the following steps.

1501. The UE 112 sends a user activation request to a PCEF 108.

1502. A transmitter 1086 of the PCEF 108 sends a CCR-1 message to a PCRF 110.

After a receiver 1082 of the PCEF 108 receives the user activation request of the UE 112, the CCR-1 message is sent to the PCRF 110, so as to further obtain a PCC policy from the PCRF 110.

1503. A processor 1104 of the PCRF 110 determines PCC policy authorization of the UE 112.

The PCRF 110 uses a service identifier and a charging identifier of a traffic 800 service for which the UE 112 registers, as the PCC policy authorization of the UE 112.

1504. A transmitter 1106 of the PCRF 110 sends a CCA-1 message to the PCEF 108.

The PCRF 110 may send a dynamic rule to the PCEF 108. The dynamic rule includes a traffic detection function (TDF) application identifier, and further includes a charging identifier corresponding to the TDF application identifier field.

Herein, the TDF application identifier field represents a service identifier of the traffic 800 service for which the UE 112 registers.

1505. The transmitter 1086 of the PCEF 108 sends a user activation success answer message to the UE 112.

1506. A receiver 1082 of the PCEF 108 receives a data flow sent by the UE 112.

1507. A processor 1084 of the PCEF 108 parses the data flow, and obtains flow description information of the data flow.

Further, the processor 1084 of the PCEF 108 further determines whether the UE 112 registers for the service that charges the OTT SP, that is, the processor 1084 of the PCEF 108 determines whether the UE 112 registers for the traffic 800 service.

1508. The transmitter 1086 of the PCEF 108 sends the flow description information to a charging control apparatus 102.

The processor 1084 of the PCEF 108 performs step 1028 after determining that the UE 112 has registered for the traffic 800 service.

The PCEF 108 sends the flow description information to the charging control apparatus 102 after determining that the UE 112 has registered for the service that charges the OTT SP. Therefore, the charging control apparatus 102 can subsequently perform processing for only the UE that has registered for the service, and performance is better.

It should be noted that, if the PCEF 108 determines that the UE 112 does not register for any traffic 800 service, the PCEF 108 performs online/offline charging in a prior-art manner.

1509. A processor 1024 of the charging control apparatus 102 determines a service identifier according to the flow description information.

The charging control apparatus 102 may store third matching information, and the third matching information includes a correspondence between a service rule set and a service identifier.

In this way, if the flow description information belongs to a service rule set, a service identifier corresponding to the service rule set may be determined according to the third matching information, and the service identifier corresponding to the service rule set is determined as the service identifier corresponding to the flow description information, that is, a service identifier corresponding to the data flow.

1510. A transmitter 1026 of the charging control apparatus 102 sends the service identifier to the PCEF 108.

1511. The processor 1084 of the PCEF 108 performs online/offline charging according to the service identifier.

The processor 1084 of the PCEF 108 uses the received service identifier to match the TDF application identifier field, and may further determine a corresponding charging identifier. In addition, the PCEF 108 performs online/offline charging according to the corresponding charging identifier.

In this embodiment of the present invention, when the UE 112 accesses a traffic 800 service, the PCEF 108 sends flow description information to the charging control apparatus 102 to obtain a service identifier. In this way, without the need of configuring the service identifier on the PCEF 108, a configuration workload can be decreased, and a configuration error rate can be further decreased.

After receiving the service identifier from the charging control apparatus 102, the PCEF 108 and a BOSS 104 may jointly implement an online/offline charging function. After step 1511 is performed, the following steps may be further included.

1512. The transmitter 1086 of the PCEF 108 sends a CCR message to the BOSS 104.

The CCR message may include the service identifier and the charging identifier.

1513. A processor 1044 of the BOSS 104 performs uniform rating for the service identifier. That is, the BOSS 104 does not need to perform differentiated rating according to users.

That is, in this embodiment shown in FIG. 15, because the dynamic rule delivered by the PCRF 110 includes the service identifier and the charging identifier of the traffic 800 service for which the UE 112 registers and the BOSS 104 does not need to perform differentiated rating according to the users, a workload of the BOSS can be decreased.

1514. A transmitter 1046 of the BOSS 104 sends a CCA message to the PCEF 108.

In this way, the PCEF 108 and the BOSS 104 may jointly complete online/offline charging.

Figure 16:
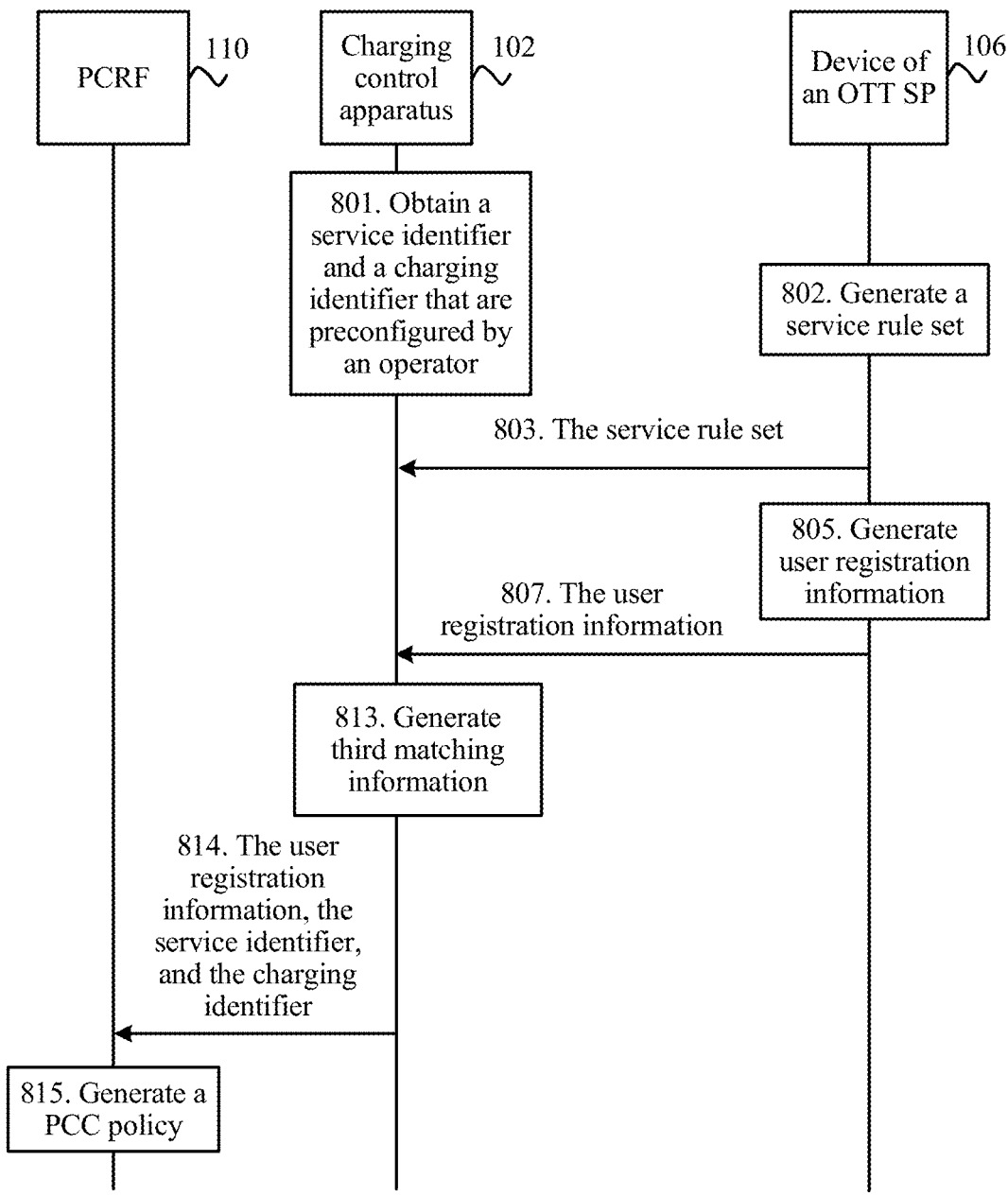
FIG. 16 is a signaling flowchart of a charging method according to another embodiment of the present invention.

Optionally, in an embodiment, if the service that charges the OTT SP is a backward charging service, before the method shown in FIG. 15 is performed, a method shown in FIG. 16 may be further included. The method shown in FIG. 16 includes: step 801, step 802, step 803, step 805, step 807, and the following steps:

813. A processor 1024 of a charging control apparatus 102 generates third matching information, where the third matching information includes a correspondence between a service identifier and a service rule set.

For example, the third matching information may be in a form of a third matching table. The third matching table may include two columns. The first column includes service identifiers, and the second column includes service rule sets. In addition, there is a correspondence between a service rule set and a service identifier that are in a same row in the third matching table.

814. A transmitter 1026 of the charging control apparatus 102 sends user registration information, a service identifier, and a charging identifier to a PCRF 110.

815. A processor 1104 of the PCRF 110 generates a PCC policy.

For example, it is assumed that the user registration information includes registration information of M UEs, and each of the M UEs may register for one or more traffic 800 services. Therefore, the PCC policy includes PCC policies of the M UEs.

For step 801 to step 805 in FIG. 16, refer to descriptions in FIG. 8, and for step 807 in FIG. 16, refer to descriptions in FIG. 9. To avoid repetition, details are not described herein again.

It should be noted that serial numbers herein should not be construed as a limitation on a sequence. For example, step 8013 may be performed before step 807, or step 8013 may be performed after step 8014. This is not limited in the present invention.

Figure 17:
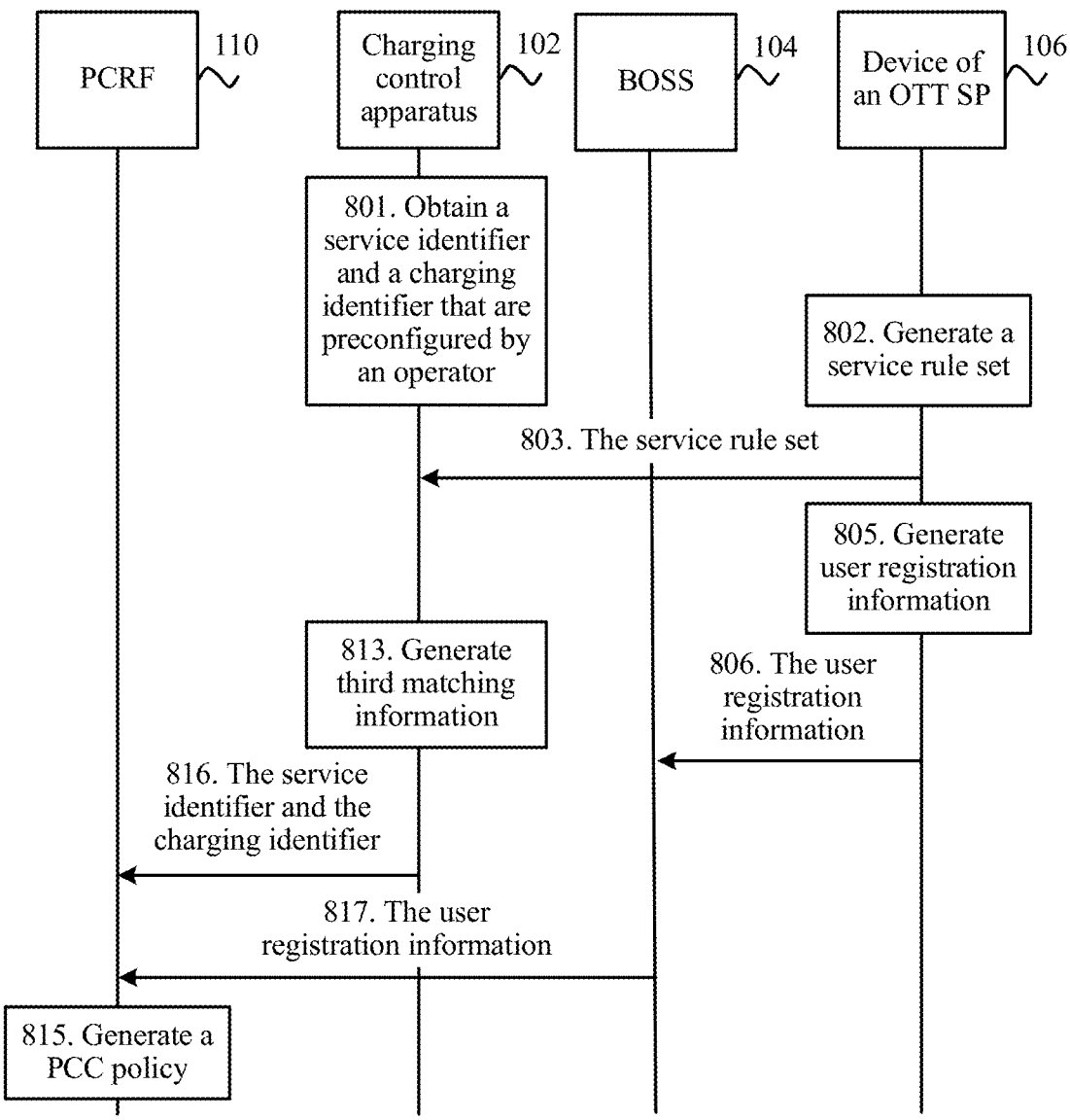
FIG. 17 is a signaling flowchart of a charging method according to another embodiment of the present invention.

Optionally, in another embodiment, if the service that charges the OTT SP is a backward charging service, before the method shown in FIG. 15 is performed, a method shown in FIG. 17 may be further included. The method shown in FIG. 17 includes: step 801, step 802, step 803, step 805, step 806, step 813, and the following steps:

816. A transmitter 1026 of a charging control apparatus 102 sends a service identifier and a charging identifier to a PCRF 110.

817. A transmitter 1046 of a BOSS 104 sends user registration information to the PCRF 110.

815. A processor 1104 of the PCRF 110 generates a PCC policy.

For step 801 to step 806 in FIG. 17, refer to descriptions in FIG. 8, and for step 813 in FIG. 17, refer to descriptions in FIG. 16. To avoid repetition, details are not described herein again.

It should be noted that serial numbers herein should not be construed as a limitation on a sequence. For example, step 816 and step 817 may be simultaneously performed. For example, step 816 and step 817 may be performed before step 813. This is not limited in the present invention.

Figure 18:
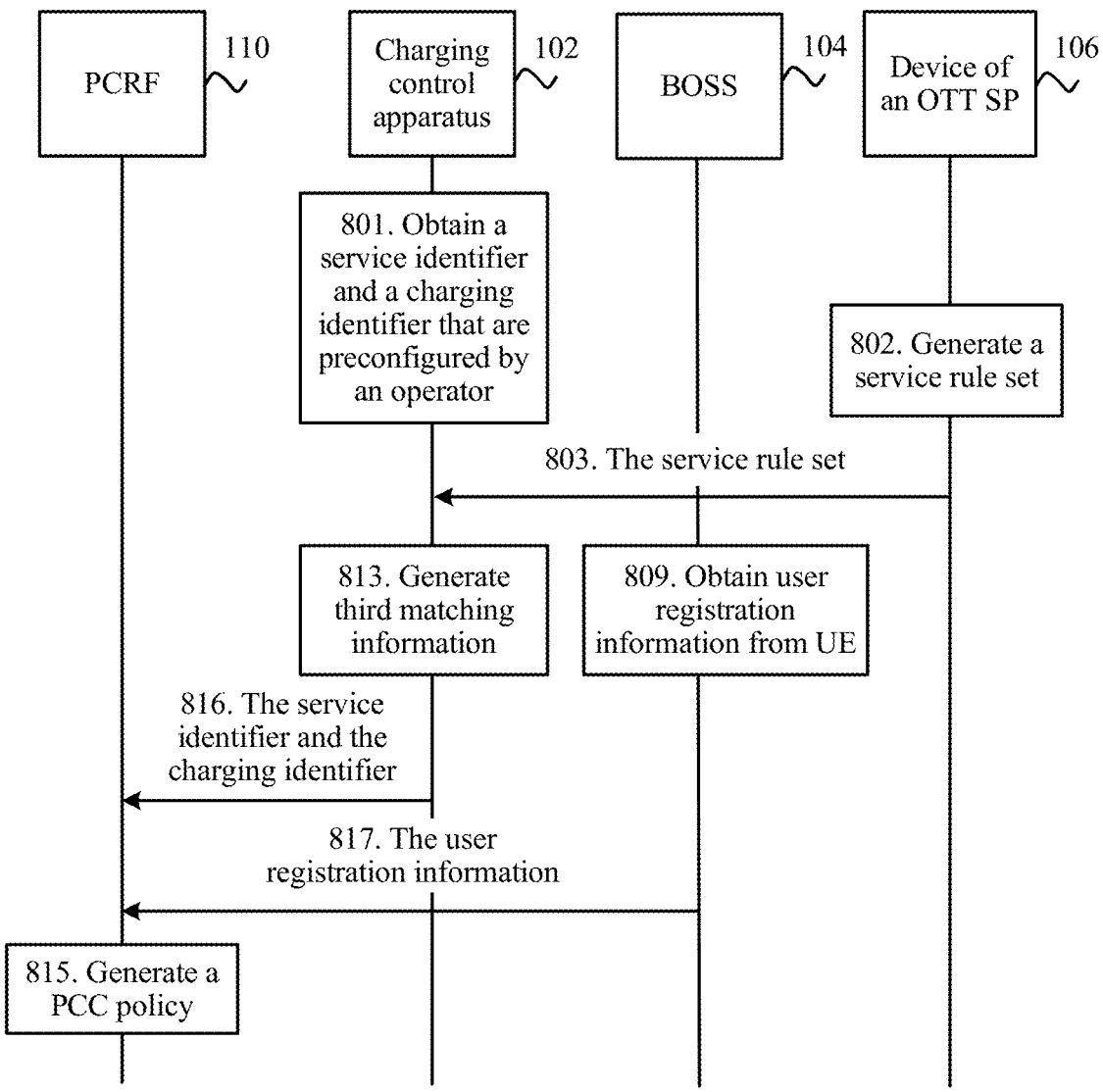
FIG. 18 is a signaling flowchart of a charging method according to another embodiment of the present invention.

Optionally, in another embodiment, if the service that charges the OTT SP is a forward charging service, before the method shown in FIG. 15 is performed, a method shown in FIG. 18 may be further included. The method shown in FIG. 18 includes: step 801, step 802, step 803, step 809, step 813, step 816, step 817, and step 815.

For step 801 to step 803 in FIG. 18, refer to descriptions in FIG. 8; for step 809 in FIG. 18, refer to a description in FIG. 10; for step 813 and step 815 in FIG. 18, refer to descriptions in FIG. 16; and for step 816 and step 817 in FIG. 18, refer to descriptions in FIG. 17. To avoid repetition, details are not described herein again.

In the embodiments shown in FIG. 15 to FIG. 18, when UE 112 accesses a traffic 800 service, a PCEF 108 sends flow description information to a charging control apparatus 102 after determining that the UE 112 registers for the traffic 800 service. The charging control apparatus 102 determines a corresponding service identifier. The PCEF 108 may receive the service identifier sent by the charging control apparatus 102, and perform charging in combination with a dynamic rule obtained from a PCRF 110. In this way, without the need of configuring the service identifier on the PCEF 108, a configuration workload of the PCEF 108 and a configuration workload of a BOSS 104 can be decreased. In addition, in this embodiment, to combine charging for the traffic 800 service and an existing PCC policy better conforms to a standard architecture of the 3rd Generation Partnership Project (3GPP).

With reference to the descriptions of the embodiments in FIG. 7 to FIG. 18:

When UE accesses a service that charges an OTT SP, the charging control apparatus 102 shown in FIG. 2 includes:

a receiver 1022, configured to receive flow description information from a PCEF, where the flow description information is obtained by the PCEF according to a data flow received from the UE;

a processor 1024, configured to determine, according to the flow description information received by the receiver 1022, a service identifier corresponding to the data flow; and a transmitter 1026, configured to send the service identifier determined by the processor 1024 to the PCEF, so that the PCEF charges for the service according to the service identifier.

Components of the charging control apparatus 102 are coupled together by using a bus system, and in addition to a data bus, the bus system further includes a power bus, a control bus, a status signal bus, and the like.

The methods disclosed in the foregoing embodiments of the present invention may be applied to the processor 1024, or implemented by the processor 1024. The processor 1024 may be an integrated circuit chip and have a signal processing capability. In an implementation process, steps in the foregoing method may be completed by using an integrated logical circuit of hardware in the processor 1024 or an instruction in a form of software. The foregoing processor 1024 may be a general-purpose processor, a digital signal processor (DSP), an application-specific integrated circuit (ASIC), a field programmable gate array (FPGA) or another programmable logical component, a discrete gate or a transistor logical component, or a discrete hardware component, and may implement or execute methods, steps, and logical block diagrams that are disclosed in the embodiments of the present invention. The general-purpose processor may be a microprocessor or the processor may be any conventional processor, or the like. The steps of the methods disclosed with reference to the embodiments of the present invention may be directly performed by a hardware decoding processor, or performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 1024. The processor 1024 reads information in the memory and completes the steps in the foregoing methods in combination with hardware of the processor.

It may be understood that the memory in the embodiments of the present invention may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. According to a description used as an example instead of being used as a limitation, RAMs of many forms are applicable, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The memory in systems and the methods described in this specification aims to include, but is not limited to these memories or any other proper type of memory.

It may be understood that the embodiments described in this specification may be implemented by hardware, software, firmware, middleware, microcode or a combination thereof. For hardware implementation, a processing unit may be implemented in one or more application-specific integrated circuits (ASIC), digital signal processors (DSP), digital signal processing devices (DSPD), programmable logical devices (PLD), field programmable gate arrays (FPGA), general-purpose processors, controllers, microcontrollers, microprocessors, other electronic units configured to perform functions described in the present invention, or a combination thereof.

When the embodiments are implemented in software, firmware, middleware, microcode, program code, or a code segment, they may be stored in a machine-readable medium of, for example, a storage component. The code segment may represent a process, a function, a subprogram, a program, a routine, a subroutine, a module, a software group, a class, or any combination of instructions, data structures or program statements. A code segment may be coupled to another code segment or a hardware circuit by transferring and/or receiving information, data, an independent variable, a parameter, or memory content. The information, the independent variable, the parameter, the data, and the like may be transferred, forwarded, or sent in any suitable manner including memory sharing, message transfer, token transfer, network transmission, or the like.

For software implementation, the technology described in this specification may be implemented by using modules for executing the functions (for example, a process or a function) described in this specification. Software code may be stored in a memory unit and executed by a processor. The memory unit may be implemented inside a processor or outside a processor, and in the latter case, the memory unit may be coupled to the processor in a communication manner through various means known in the art.

Optionally, in an embodiment, before receiving the flow description information, the receiver 1022 is configured to: obtain a service identifier and a charging identifier that are preconfigured by an operator, and receive a service rule set sent by a device of an OTT SP. The processor 1024 is configured to generate third matching information. The third matching information includes a correspondence between a service identifier and a service rule set. The transmitter 1026 is configured to send the service identifier and the charging identifier to the PCRF.

Therefore, the processor 1024 may search the third matching information according to the flow description information, so as to determine a corresponding service identifier. For the third matching information, refer to a description of step 813 in the embodiment in FIG. 16. To avoid repetition, details are not described herein again.

Optionally, if the service that charges the OTT SP is a backward charging service, before receiving the flow description information, the receiver 1022 is further configured to receive user registration information sent by the device of the OTT SP; and the transmitter 1026 is further configured to send the user registration information to the PCRF.

Optionally, in another embodiment, the processor 1024 is further configured to determine, according to the flow description information received by the receiver 1022, a charging identifier corresponding to the data flow; and the transmitter 1026 is further configured to send the charging identifier to the PCEF.

Before receiving the flow description information, the receiver 1022 is configured to: obtain a service identifier and a charging identifier that are preconfigured by an operator, and receive a service rule set sent by a device of an OTT SP. The processor 1024 is configured to generate second matching information. The second matching information includes a correspondence among a service rule set, a service identifier, and a charging identifier.

For the second matching information, refer to descriptions of step 804 in the embodiment in FIG. 8. To avoid repetition, details are not described herein again. For example, the second matching information may be shown in Table 1.

The processor 1024 may search the second matching information according to the flow description information, so as to determine the corresponding service identifier and charging identifier.

For example, for the second matching information shown in Table 1, if the flow description information belongs to a second service rule set, the processor 1024 may determine that the corresponding service identifier and charging identifier are respectively a second service identifier and a second charging identifier.

Optionally, if the service that charges the OTT SP is a backward charging service, before receiving the flow description information, the receiver 1022 is further configured to receive user registration information sent by the device of the OTT SP; and the transmitter 1026 is further configured to send the user registration information to a BOSS.

Optionally, in another embodiment, the receiver 1022 may further receive a user identifier of UE that is sent by the PCEF. The processor 1024 is specifically configured to: determine, according to the flow description information, the service identifier and the charging identifier that are corresponding to the data flow; and determine whether there is a correspondence between the user identifier and the service identifier. When the processor 1024 determines that there is a correspondence between the user identifier and the service identifier, the transmitter 1026 is specifically configured to send the service identifier and the charging identifier to the PCEF.

Before receiving the flow description information, the receiver 1022 is configured to: obtain a service identifier and a charging identifier that are preconfigured by an operator, and receive a service rule set sent by a device of an OTT SP. The receiver 1022 is further configured to receive user registration information sent by the device of the OTT SP or a BOSS. The processor 1024 is configured to generate second matching information. The second matching information includes a correspondence among a service rule set, a service identifier, and a charging identifier. The processor 1024 is further configured to generate first matching information, and the first matching information includes a correspondence between a service identifier and a user identifier.

The processor 1024 may determine, by searching the first matching information, whether there is a correspondence between the user identifier and the service identifier. For the first matching information, refer to descriptions of step 810 in the embodiment in FIG. 13. To avoid repetition, details are not described herein again.

For example, for the first matching information shown in Table 2, if the service identifier determined by the processor 1024 according to the second matching information is a second service identifier and the user identifier received by the receiver 1022 from the PCEF is a fourth user identifier, the processor 1024 may determine, according to the first matching information, that there is a correspondence between the second service identifier and the fourth user identifier.

If the service that charges the OTT SP is a backward charging service, the user registration information may be received by the receiver 1022 from the device of the OTT SP. Alternatively, after being sent to the BOSS by the device of the OTT SP, the user registration information may be received by the receiver 1022 from the BOSS.

If the service that charges the OTT SP is a forward charging service, the user registration information may be received by the receiver 1022 from the BOSS.

In this way, this embodiment of the present invention provides a charging control apparatus configured to charge for a service that charges an OTT SP. After an operator preconfigures a service identifier and a charging identifier on the charging control apparatus, the service identifier and the charging identifier may be automatically synchronized to another network element through a process. For example, PCEFs in provincial networks may obtain required service identifiers and charging identifiers from the charging control apparatus. Repeated configuration work on the PCEFs in the provincial networks can be omitted, the operator does not need to consider differences in deep packet inspection (DPI) capabilities, configuration architectures, rule configuration manners, and the like between different PCEFs produced by different manufacturers in the provincial networks, a workload of an operation and maintenance department of the operator can be greatly decreased, and impact caused by incorrect configuration or missing configuration can be avoided.

When the service that charges the OTT SP is updated or there is a new service that charges the OTT SP, the operator needs to perform updating or configuration only on the charging control apparatus. In addition, as an independent device of the operator, the charging control apparatus is easy to maintain and extend, and can support deployment of services of millions of orders of magnitude.

When UE accesses the service that charges the OTT SP, the PCEF 108 shown in FIG. 3 includes:

a receiver 1082, configured to receive a data flow sent by the UE;

a processor 1084, configured to: parse the data flow, and determine flow description information of the data flow; and a transmitter 1086, configured to send the flow description information to a charging control apparatus.

The receiver 1082 is further configured to receive a service identifier sent by the charging control apparatus, where the service identifier is determined by the charging control apparatus according to the flow description information.

The processor 1084 is further configured to perform online/offline charging for the service according to the service identifier.

Optionally, in an embodiment, the processor 1084 is further configured to determine whether the UE registers for the service. When the processor 1084 determines that the UE registers for the service, the transmitter 1086 sends the flow description information to the charging control apparatus.

Before the receiver 1082 receives the data flow sent by the UE, the receiver 1082 is further configured to receive a dynamic rule from a PCRF. The dynamic rule includes a traffic detection function (TDF) application identifier, and further includes a charging identifier corresponding to the TDF application identifier field.

The processor 1084 is specifically configured to use the service identifier received by the receiver 1082 to match the TDF application identifier field, and may further determine the corresponding charging identifier. Further, the processor 1084 may perform online/offline charging according to the charging identifier.

That the processor 1084 performs online/offline charging according to the charging identifier may be jointly implemented by the PCEF and a BOSS. The transmitter 1086 may further send a credit control request (CCR) message to the BOSS. After the BOSS performs rating, the receiver 1082 receives a credit control answer (CCA) message sent by the BOSS. In a process in which the BOSS performs rating, the BOSS does not need to perform differentiated rating according to users.

Optionally, in another embodiment, the transmitter 1086 is further configured to send a user identifier of the UE to the charging control apparatus. In addition, the receiver 1082 is specifically configured to receive the service identifier and the charging identifier from the charging control apparatus. Further, the processor 1084 is configured to perform online/offline charging according to the service identifier and the charging identifier. The charging is performed for a service that has the service identifier.

That the processor 1084 performs online/offline charging according to the charging identifier may be jointly implemented by the PCEF and a BOSS. The transmitter 1086 may further send a CCR message to the BOSS. After the BOSS performs differentiated rating, the receiver 1082 receives a CCA message sent by the BOSS.

The PCRF 110 shown in FIG. 4 includes:

a receiver 1102, configured to: receive the service identifier and the charging identifier from the charging control apparatus, and receive user registration information from the charging control apparatus or the BOSS; and a processor 1104, configured to generate a PCC policy according to the user registration information, the service identifier, and the charging identifier that are received by the receiver 1102.

Optionally, if the service that charges the OTT SP is a backward charging service, the receiver 1102 may receive the user registration information from the charging control apparatus or the BOSS. The user registration information is generated and sent to the charging control apparatus or the BOSS by the device of the OTT SP.

Optionally, if the service that charges the OTT SP is a forward charging service, the receiver 1102 may receive the user registration information from the BOSS. The user registration information is obtained by performing proactive registration by the UE.

The BOSS 104 shown in FIG. 5 includes:

a receiver 1042, configured to receive user registration information; and a transmitter 1046, configured to send the user registration information to the charging control apparatus.

Optionally, if the service that charges the OTT SP is a backward charging service, the receiver 1042 may receive the user registration information from the device of the OTT SP.

Optionally, if the service that charges the OTT SP is a forward charging service, the receiver 1042 may receive the user registration information from the UE.

The BOSS 104 may further include a processor 1044. Further, when the UE accesses the service, the receiver 1042 may receive a CCR message sent by the PCEF. The processor 1044 may perform rating. The transmitter 1046 may send a CCA message to the PCEF. When performing rating, the processor 1044 does not need to perform differentiated rating according to users.

Optionally, in another embodiment, if the service that charges the OTT SP is a backward charging service, the receiver 1042 may receive the user registration information from the device of the OTT SP or the charging control apparatus. If the service that charges the OTT SP is a forward charging service, the receiver 1042 may receive the user registration information from the UE.

Further, when the UE accesses the service, the receiver 1042 may receive a CCR message sent by the PCEF. The processor 1044 may perform differentiated rating according to the user registration information. The transmitter 1046 may send a CCA message to the PCEF.

That is, in the another embodiment, the receiver 1042 does not send the user registration information to the charging control apparatus after receiving the user registration information, so that the BOSS 104 subsequently performs differentiated rating according to the user registration information.

The device 106 of the OTT SP shown in FIG. 6 includes:

a processor 1064, configured to generate a service rule set; and a transmitter 1066, configured to send the service rule set to the charging control apparatus.

Optionally, if the service that charges the OTT SP is a backward charging service, the processor 1064 is further configured to generate user registration information. Further, the transmitter 1066 is further configured to send the user registration information to the charging control apparatus or the BOSS.

Figure 19:
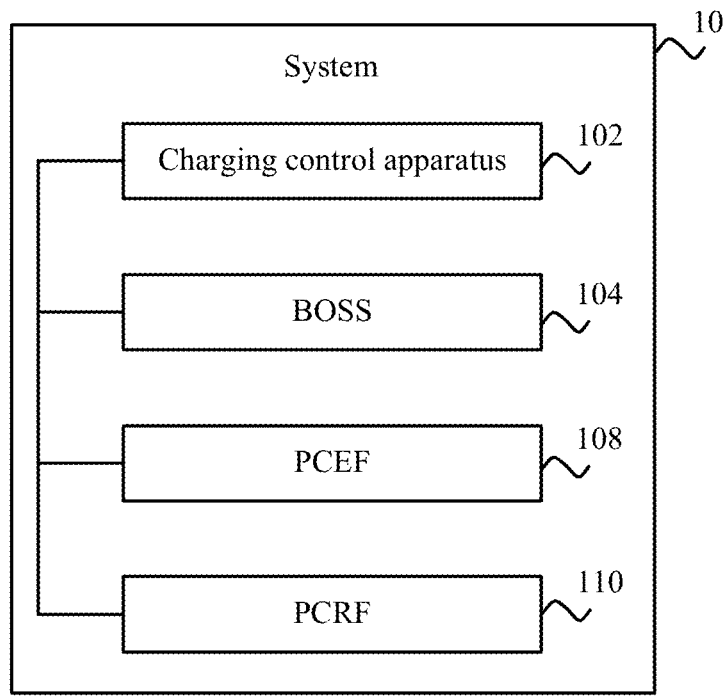
FIG. 19 is a schematic structural diagram of a charging system according to an embodiment of the present invention.

FIG. 19 is a schematic structural diagram of a charging system according to an embodiment of the present invention. A system 10 shown in FIG. 19 may include a charging control apparatus 102, a PCEF 108, a PCRF 110, and a BOSS 104.

For descriptions of the system 10, refer to FIG. 1. To avoid repetition, details are not described herein again.

Figure 20:
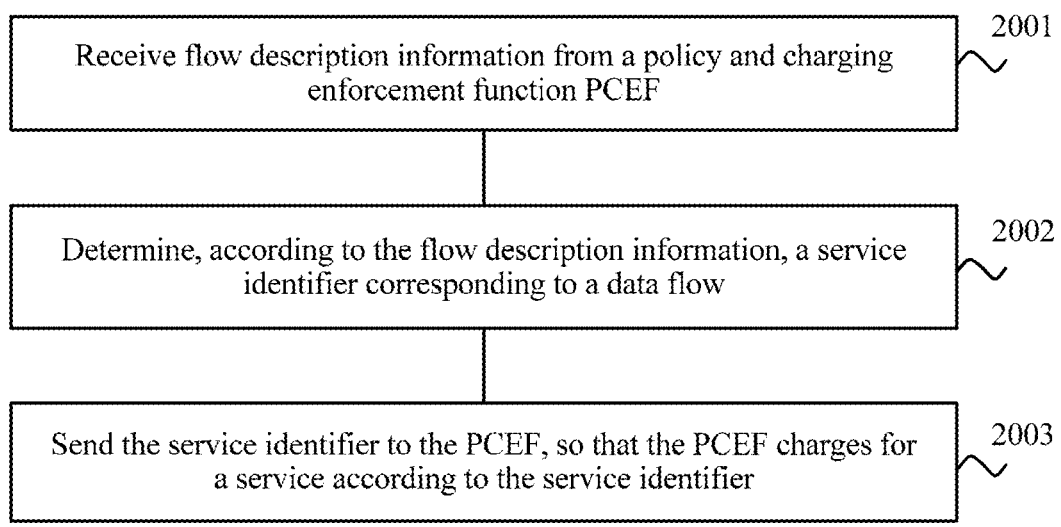
FIG. 20 is a flowchart of a charging method according to an embodiment of the present invention.

FIG. 20 is a flowchart of a charging method according to an embodiment of the present invention. When user equipment UE accesses a service that charges an over the top OTT service provider SP, the method shown in FIG. 20 includes the following steps:

2001. Receive flow description information from a policy and charging enforcement function PCEF, where the flow description information is obtained by the PCEF according to a data flow received from the UE.

2002. Determine, according to the flow description information, a service identifier corresponding to the data flow.

2003. Send the service identifier to the PCEF, so that the PCEF charges for the service according to the service identifier.

In this embodiment of the present invention, when the UE accesses a service, the PCEF sends flow description information to the charging control apparatus, and the charging control apparatus determines a service identifier and a charging identifier that are corresponding to a data flow and sends the service identifier and the charging identifier to the PCEF. In this way, without the need of configuring the service identifier and the charging identifier on the PCEF, the PCEF can obtain the service identifier and the charging identifier that are corresponding to the data flow. Therefore, a configuration workload can be decreased.

Optionally, in an embodiment, the determining, according to the flow description information, a service identifier corresponding to the data flow includes: determining, according to the flow description information, the service identifier and a charging identifier that are corresponding to the data flow; and the sending the service identifier to the PCEF includes: sending the service identifier and the charging identifier to the PCEF.

Optionally, in another embodiment, the method further includes: receiving a user identifier of the UE from the PCEF; and determining whether there is a correspondence between the user identifier and the service identifier.

The sending the service identifier and the charging identifier to the PCEF includes: when it is determined that there is a correspondence between the user identifier and the service identifier, sending the service identifier and the charging identifier to the PCEF.

Optionally, in another embodiment, before the receiving flow description information from a PCEF, the method further includes: receiving user registration information sent by a device of the OTT SP or a business and operation support system BOSS; and generating first matching information according to the user registration information, where the first matching information includes a correspondence between a user identifier and a service identifier.

Optionally, in another embodiment, the determining whether there is a correspondence between the user identifier and the service identifier includes: determining, according to the first matching information, whether there is a correspondence between the user identifier and the service identifier.

Optionally, in another embodiment, before the receiving flow description information from a PCEF, the method further includes: receiving user registration information sent by a device of the OTT SP; and sending the user registration information to a business and operation support system BOSS.

Optionally, in another embodiment, before the receiving flow description information from a PCEF, the method further includes: obtaining a service identifier and a charging identifier that are configured by an operator, and receiving a service rule set sent by a device of the OTT SP; and generating second matching information according to the service rule set, where the second matching information includes a correspondence among a service rule set, a service identifier, and a charging identifier.

Optionally, in another embodiment, the determining, according to the flow description information, the service identifier and a charging identifier that are corresponding to the data flow includes: determining, according to the second matching information, the service identifier and the charging identifier that are corresponding to the data flow.

Optionally, in another embodiment, before the receiving flow description information from a PCEF, the method further includes: obtaining a service identifier and a charging identifier that are configured by an operator, and receiving a service rule set sent by a device of the OTT SP; sending the service identifier and the charging identifier to a policy and charging rules function PCRF; and generating third matching information according to the service rule set, where the third matching information includes a correspondence between a service rule set and a service identifier.

Optionally, in another embodiment, before the receiving flow description information from a PCEF, the method further includes: receiving user registration information sent by a device of the OTT SP; and sending the user registration information to the PCRF.

The charging method shown in FIG. 20 may be implemented by the charging control apparatus 102 in the foregoing embodiments.

Figure 21:
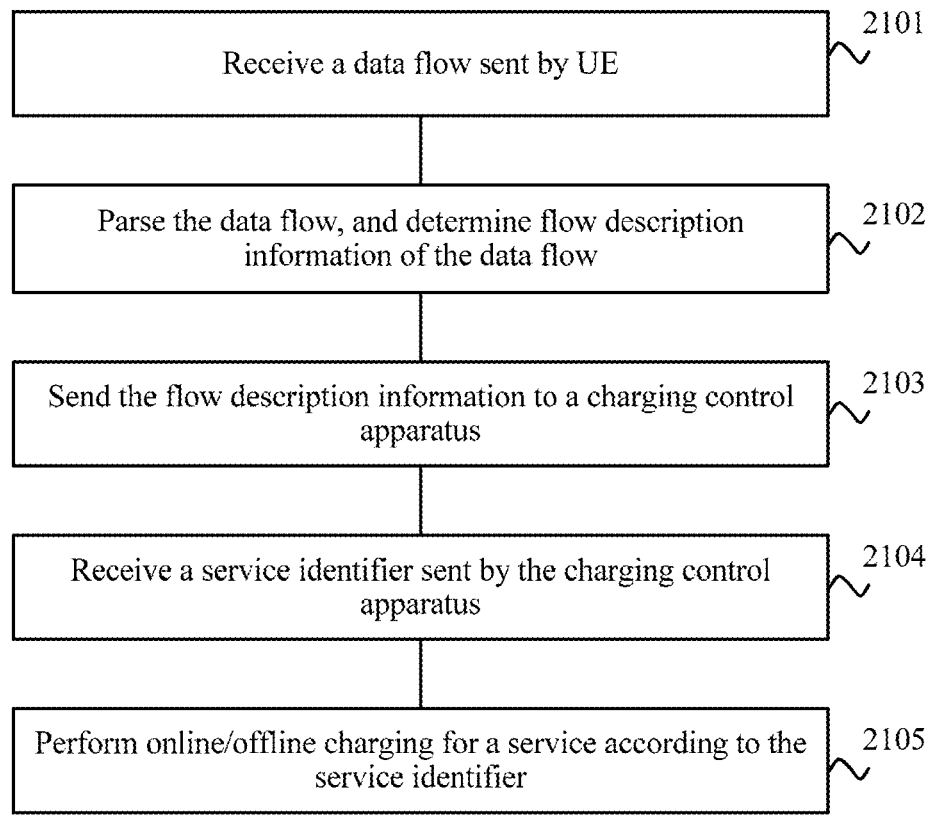
FIG. 21 is a flowchart of a charging method according to another embodiment of the present invention.

FIG. 21 is a flowchart of a charging method according to another embodiment of the present invention. The method shown in FIG. 21 is performed by a policy and charging enforcement function PCEF, and when user equipment UE accesses a service that charges an over the top OTT service provider SP, the method includes the following steps:

2101. Receive a data flow sent by the UE.

2102. Parse the data flow, and determine flow description information of the data flow.

2103. Send the flow description information to a charging control apparatus.

2104. Receive a service identifier sent by the charging control apparatus, where the service identifier is determined by the charging control apparatus according to the flow description information.

2105. Perform online/offline charging for the service according to the service identifier.

In this embodiment of the present invention, when the UE accesses a service, the PCEF sends flow description information to the charging control apparatus, and the charging control apparatus determines a service identifier and a charging identifier that are corresponding to a data flow and sends the service identifier and the charging identifier to the PCEF. In this way, without the need of configuring the service identifier and the charging identifier on the PCEF, the PCEF can obtain the service identifier and the charging identifier that are corresponding to the data flow. Therefore, a configuration workload can be decreased.

Optionally, in an embodiment, the receiving a service identifier sent by the charging control apparatus includes: receiving the service identifier and a charging identifier that are sent by the charging control apparatus, where the service identifier and the charging identifier are determined by the charging control apparatus according to the flow description information; and the performing online/offline charging for the service according to the service identifier includes: performing online/offline charging for the service according to the service identifier and the charging identifier.

Optionally, in another embodiment, before the sending the flow description information to a charging control apparatus, the method further includes: determining whether the UE registers for the service; and the sending the flow description information to a charging control apparatus includes: when the UE registers for the service, sending the flow description information to the charging control apparatus.

The charging method shown in FIG. 21 may be implemented by the PCEF 108 in the foregoing embodiments.

Figure 22:
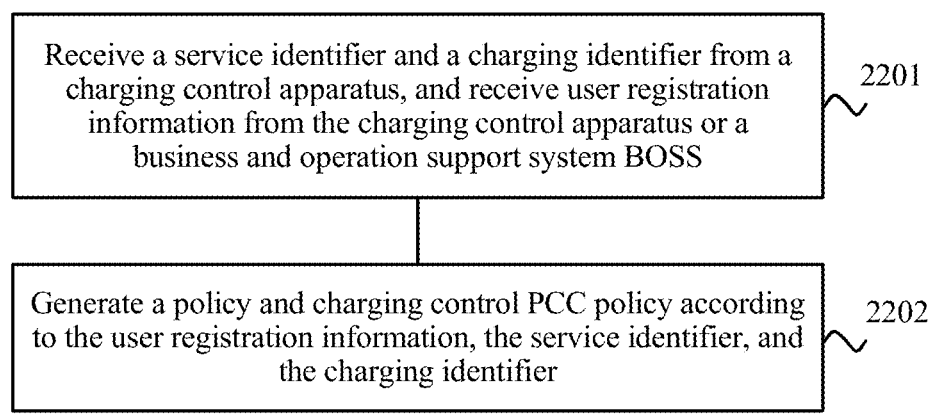
FIG. 22 is a flowchart of a charging method according to another embodiment of the present invention.

FIG. 22 is a flowchart of a charging method according to another embodiment of the present invention. The method shown in FIG. 22 is performed by a policy and charging rules function PCRF and includes the following steps:

2201. Receive a service identifier and a charging identifier from a charging control apparatus, and receive user registration information from the charging control apparatus or a business and operation support system BOSS.

2202. Generate a policy and charging control PCC policy according to the user registration information, the service identifier, and the charging identifier.

In this embodiment of the present invention, the PCRF generates a PCC policy according to a service identifier and a charging identifier that are received from the charging control apparatus, and user registration information received from the charging control apparatus or the BOSS, and the PCC policy can be used by a PCEF to charge for a service that charges an OTT SP. In this way, without the need of configuring the service identifier and the charging identifier on the PCEF, the PCEF can obtain the service identifier and the charging identifier that are corresponding to a data flow. Therefore, a configuration workload can be decreased.

The charging method shown in FIG. 22 may be implemented by the foregoing PCRF 110.

Figure 23:
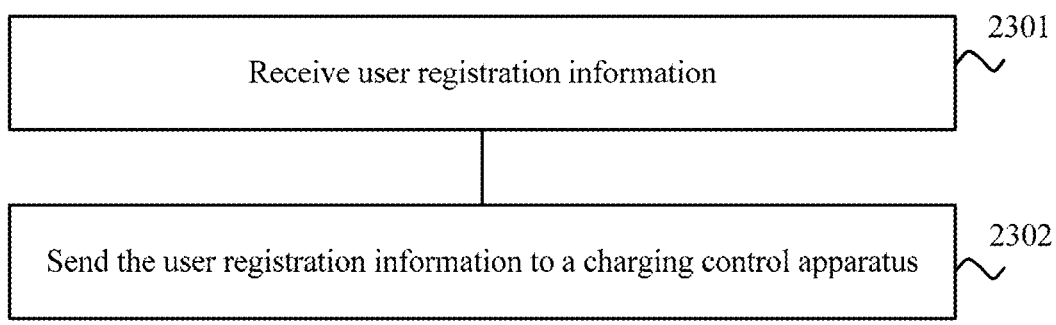
FIG. 23 is a flowchart of a charging method according to another embodiment of the present invention.

FIG. 23 is a flowchart of a charging method according to another embodiment of the present invention. The method shown in FIG. 23 is performed by a business and operation support system BOSS and includes the following steps:

2301. Receive user registration information.

2302. Send the user registration information to a charging control apparatus.

Optionally, in an embodiment, when a service that charges an over the top OTT service provider SP is a backward charging service, step 2301 includes: receiving the user registration information from a device of the OTT SP; or when a service that charges an over the top OTT service provider SP is a forward charging service, step 2301 includes: receiving the user registration information from user equipment UE.

The charging method shown in FIG. 23 may be implemented by the foregoing BOSS 104.

Figure 24:
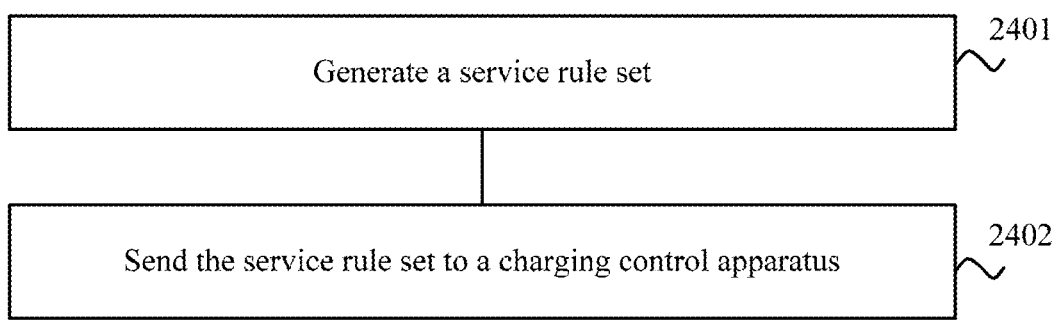
FIG. 24 is a flowchart of a charging method according to another embodiment of the present invention.

FIG. 24 is a flowchart of a charging method according to another embodiment of the present invention. The method shown in FIG. 24 is performed by a device of an over the top OTT service provider SP and includes the following steps:

2401. Generate a service rule set.

2402. Send the service rule set to a charging control apparatus.

Optionally, in an embodiment, when a service that charges the OTT SP is a backward charging service, the method further includes: generating user registration information; and sending the user registration information to the charging control apparatus or a business and operation support system BOSS.

The charging method shown in FIG. 24 may be implemented by the foregoing device 106 of the OTT SP.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in the present invention, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A charging control apparatus comprising a receiver, a transmitter and a processor, wherein:
   the receiver, in coordination with the processor, is configured to obtain a service identifier and a charging identifier that are configured by an operator, and receive a service rule set sent by a device of an over the top (OTT) service provider (SP);
   the processor is configured to generate third matching information, which comprises a correspondence between a service rule set and a service identifier, according to the service rule set;
   the transmitter, in coordination with the processor, is configured to send the service identifier and the charging identifier to a policy and charging rules function (PCRF) to generate a policy and charging control (PCC) policy;

the receiver is further configured to receive flow description information from a policy and charging enforcement function (PCEF), wherein the flow description information is obtained by the PCEF according to a data flow received from a user equipment (UE) which accesses a service that charges the OTT SP;

the processor is further configured to determine, according to the third matching information and the flow description information received by the receiver, a service identifier corresponding to the data flow; and the transmitter is further configured to send the service identifier determined by the processor to the PCEF, so that the PCEF charges for the service according to a dynamic rule obtained from the PCRF and the service identifier.

2. The charging control apparatus according to claim 1, wherein
the receiver is further configured to receive user registration information sent by the device of the OTT SP; and
the transmitter is further configured to send the user registration information to the PCRF.

3. A charging method comprising:
obtaining a service identifier and a charging identifier that are configured by an operator;
receiving a service rule set sent by a device of an over the top (OTT) service provider (SP);
generating third matching information, which comprises a correspondence between a service rule set and a service identifier, according to the service rule set;
sending the service identifier and the charging identifier to a policy and charging rules function (PCRF) to generate a policy and charging control (PCC) policy;
receiving flow description information from a policy and charging enforcement function (PCEF) based on a user equipment (UE) accessing a service that charges the OTT SP, wherein the flow description information is obtained by the PCEF according to a data flow received from the UE;
determining, according to the third matching information and the flow description information, a service identifier corresponding to the data flow; and
sending the service identifier to the PCEF, so that the PCEF charges for the service according to a dynamic rule obtained from the PCRF and the service identifier.

4. The method according to claim 3, further comprising:
receiving user registration information sent by the device of the OTT SP; and
sending the user registration information to the PCRF.

* * * * *